US012063363B2

(12) United States Patent
Komiya et al.

(10) Patent No.: US 12,063,363 B2
(45) Date of Patent: Aug. 13, 2024

(54) IMAGE CODING APPARATUS FOR CODING TILE BOUNDARIES

(71) Applicant: Sun Patent Trust, New York, NY (US)

(72) Inventors: Daisaku Komiya, Tokyo (JP); Takahiro Nishi, Nara (JP); Youji Shibahara, Osaka (JP); Hisao Sasai, Osaka (JP); Toshiyasu Sugio, Osaka (JP); Kyoko Tanikawa, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 18/202,035

(22) Filed: May 25, 2023

(65) Prior Publication Data

US 2023/0345002 A1 Oct. 26, 2023

Related U.S. Application Data

(63) Continuation of application No. 17/540,817, filed on Dec. 2, 2021, now Pat. No. 11,706,416, which is a
(Continued)

(51) Int. Cl.
*G06V 10/00* (2022.01)
*G06T 9/00* (2006.01)
(Continued)

(52) U.S. Cl.
CPC ............ *H04N 19/124* (2014.11); *G06T 9/00* (2013.01); *G06T 9/005* (2013.01); *G06T 9/007* (2013.01);
(Continued)

(58) Field of Classification Search
CPC .... H04N 19/124; H04N 19/46; H04N 19/134; H04N 19/13; H04N 19/17; H04N 19/172;
(Continued)

(56) References Cited

U.S. PATENT DOCUMENTS 6,370,273 B1  4/2002  Kuo
6,668,086 B1  12/2003 Enokida
(Continued)

FOREIGN PATENT DOCUMENTS

CA         2941053      2/2013
WO    2013/067158      5/2013

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, Document: JCTVC-F803_d0, Ver. 1, 6th Meeting: Torino, IT, Jul. 14-22, 2011.
(Continued)

*Primary Examiner* — Amir Alavi
(74) *Attorney, Agent, or Firm* — Greenblum & Bernstein, P.L.C.

(57) ABSTRACT

A processor obtains pieces of coded data, which are included in a bitstream and generated by coding tiles, and tile boundary independence information, which indicates whether each boundary between the tiles is a first or second boundary. Image data of a first tile is generated by decoding a first code string included in first coded data with reference to decoding information of a decoded tile when the tile boundary independence information indicates the first boundary, and by decoding the first code string without referring to the decoding information when the tile boundary independence information indicates the second boundary. A bit string is added after the first code string to make a bit length of first coded data a multiple of a predetermined N bits, with N being an integer greater than or equal to 2.

3 Claims, 38 Drawing Sheets

Related U.S. Application Data continuation of application No. 16/897,938, filed on Jun. 10, 2020, now Pat. No. 11,228,765, which is a continuation of application No. 16/530,137, filed on Aug. 2, 2019, now Pat. No. 10,715,808, which is a continuation of application No. 15/991,061, filed on May 29, 2018, now Pat. No. 10,412,389, which is a continuation of application No. 15/469,611, filed on Mar. 27, 2017, now Pat. No. 10,009,609, which is a continuation of application No. 15/142,007, filed on Apr. 29, 2016, now Pat. No. 9,648,328, which is a continuation of application No. 14/492,587, filed on Sep. 22, 2014, now Pat. No. 9,355,467, which is a continuation of application No. 14/090,592, filed on Nov. 26, 2013, now Pat. No. 8,879,860, which is a continuation of application No. 13/568,444, filed on Aug. 7, 2012, now Pat. No. 8,620,097.

(60) Provisional application No. 61/522,382, filed on Aug. 11, 2011.

(51) Int. Cl.

| | |
|---|---|
| *H04N 19/124* | (2014.01) |
| *H04N 19/13* | (2014.01) |
| *H04N 19/134* | (2014.01) |
| *H04N 19/17* | (2014.01) |
| *H04N 19/172* | (2014.01) |
| *H04N 19/174* | (2014.01) |
| *H04N 19/176* | (2014.01) |
| *H04N 19/436* | (2014.01) |
| *H04N 19/46* | (2014.01) |
| *H04N 19/503* | (2014.01) |
| *H04N 19/51* | (2014.01) |
| *H04N 19/593* | (2014.01) |
| *H04N 19/60* | (2014.01) |
| *H04N 19/70* | (2014.01) |

(52) U.S. Cl.
CPC ............. *G06T 9/008* (2013.01); *H04N 19/13* (2014.11); *H04N 19/134* (2014.11); *H04N 19/17* (2014.11); *H04N 19/172* (2014.11); *H04N 19/174* (2014.11); *H04N 19/176* (2014.11); *H04N 19/436* (2014.11); *H04N 19/46* (2014.11); *H04N 19/503* (2014.11); *H04N 19/51* (2014.11); *H04N 19/593* (2014.11); *H04N 19/60* (2014.11); *H04N 19/70* (2014.11)

(58) Field of Classification Search
CPC .. H04N 19/174; H04N 19/176; H04N 19/436; H04N 19/503; H04N 19/51; H04N 19/60; H04N 19/593; H04N 19/60; H04N 19/70; H04N 19/00521; H04N 19/00121; H04N 19/00763; G06T 9/008; G06T 9/00; G06T 9/005; G06T 9/007
See application file for complete search history.

(56) References Cited

U.S. PATENT DOCUMENTS

| | | |
|---|---|---|
| 6,671,413 B1 | 12/2003 | Pearlman et al. |
| 6,792,153 B1 | 9/2004 | Tsujii |
| 7,418,144 B2 | 8/2008 | Wang et al. |
| 7,949,054 B2 | 5/2011 | Tu et al. |
| 8,228,214 B2 | 7/2012 | Shigenobu et al. |
| 8,515,194 B2 | 8/2013 | Srinivasan et al. |
| 8,620,097 B2 * | 12/2013 | Komiya ............... H04N 19/503 382/232 |
| 8,879,860 B2 * | 11/2014 | Komiya ............... H04N 19/46 382/233 |
| 8,989,271 B2 | 3/2015 | Sugio et al. |
| 8,990,435 B2 | 3/2015 | Cheng et al. |
| 9,060,174 B2 | 6/2015 | Horowitz |
| 9,077,998 B2 | 7/2015 | Wang et al. |
| 9,124,895 B2 | 9/2015 | Wang |
| 9,355,467 B2 * | 5/2016 | Komiya ............... H04N 19/436 |
| 9,648,328 B2 * | 5/2017 | Komiya ............... H04N 19/134 |
| 9,749,627 B2 | 8/2017 | Wu et al. |
| 9,986,235 B2 | 5/2018 | Hattori et al. |
| 10,009,609 B2 * | 6/2018 | Komiya ............... H04N 19/176 |
| 10,104,386 B2 * | 10/2018 | Suehring ............... H04N 19/70 |
| 10,154,274 B2 * | 12/2018 | Lainema ............... H04N 19/70 |
| 10,412,389 B2 * | 9/2019 | Komiya ............... H04N 19/17 |
| 10,715,808 B2 * | 7/2020 | Komiya ............... H04N 19/60 |
| 11,228,765 B2 * | 1/2022 | Komiya ............... H04N 19/503 |
| 11,553,190 B2 | 1/2023 | Auyeung et al. |
| 11,706,416 B2 * | 7/2023 | Komiya ............... H04N 19/17 382/251 |
| 2003/0165273 A1 * | 9/2003 | Berkner .................. G06T 7/11 382/302 |
| 2004/0207872 A1 | 10/2004 | Takahashi et al. |
| 2006/0269151 A1 | 11/2006 | Sakuyama |
| 2008/0019438 A1 | 1/2008 | Takahashi et al. |
| 2008/0112489 A1 | 5/2008 | Malladi et al. |
| 2012/0163452 A1 | 6/2012 | Horowitz |
| 2012/0230428 A1 | 9/2012 | Segall et al. |
| 2012/0328021 A1 | 12/2012 | Sugio et al. |
| 2013/0010869 A1 | 1/2013 | Sugio et al. |
| 2013/0016786 A1 | 1/2013 | Segall |
| 2013/0034161 A1 | 2/2013 | Sugio et al. |
| 2013/0039593 A1 | 2/2013 | Komiya et al. |
| 2013/0101035 A1 | 4/2013 | Wang et al. |
| 2013/0107952 A1 | 5/2013 | Coban et al. |
| 2013/0114736 A1 | 5/2013 | Wang et al. |
| 2013/0208808 A1 | 8/2013 | Sasai et al. |
| 2014/0247875 A1 | 9/2014 | Hattori et al. |
| 2015/0010063 A1 | 1/2015 | Komiya et al. |
| 2015/0016520 A1 | 1/2015 | Rapaka et al. |
| 2016/0165248 A1 | 6/2016 | Lainema et al. |
| 2016/0249052 A1 | 8/2016 | Komiya et al. |
| 2018/0278935 A1 | 9/2018 | Komiya et al. |

OTHER PUBLICATIONS

International Search Report from WIPO in International Patent Application No. PCT/JP2012/005000, dated Nov. 6, 2012.
Annex K: Slice Structured mode, ITU-T Recommendation H.263 (Jan. 2005), ITU-T, 2005, pp. 85-88.
Kimihiko Kazui et al., "Support of very low delay coding in Title", Joint Collaborative Team on Video Coding (JCT-VC) of ITU-T SG16 WP3 and ISO/IEC JTC1/SC29/WG11 6th Meeting, Torino, IT, Jul. 14-22, 2011[Document: JCTVC-F140].
U.S. Appl. No. 13/479,636 to Toshiyasu Sugio et al., which was filed May 24, 2012.
U.S. Appl. No. 13/479,669 to Toshiyasu Sugio et al., which was filed May 24, 2012.
U.S. Appl. No. 13/482,549 to Toshiyasu Sugio et al., which was filed May 29, 2012.
U.S. Appl. No. 13/565,384 to Toshiyasu Sugio et al., which was filed Aug. 2, 2012.
Fuldseth et al., "Joint Collaborative Team on Video Coding (JCT-VC) of ITU-T SG16 WP3 and ISO/IEC JTC1/SC29/WG11", 6th Meeting:Torino, IT, Document JCTVC-F335, pp. 1-15 (Jul. 14-22, 2011).
Misra et al., "Joint Collaborative Team on Video Coding (JCT-VC) of ITU-T SG16 WP3 and ISO/IEC JTC1/SC29/WG11", 6th Meeting: Torino, IT, Document JCTVC-F594, pp. 1-6 (Jul. 14-22, 2011).
Extended European Search Report (EESR) from European Patent Office (EPO) in European Patent Application No. 12821785.8, dated Jan. 30, 2015.
Office Action from State Intellectual Property Office (SIPO) of the People's Republic of China in Chinese Patent Application No. 201280008126.2, dated Sep. 1, 2016, together with an English language translation.

(56) References Cited

OTHER PUBLICATIONS

Arild Fuldseth et al., "Tiles", Joint Collaborative Team on Video Coding (JCT-VC) of ITU-T SG16 WP3 and ISO/IEC JTC1/SC29/WG11, 6th Meeting: Torino, IT, pp. 1-20 (Jul. 14-22, 2011).
Office Action from Canadian Intellectual Property Office in Canadian Patent Appl. No. 2827849, dated May 31, 2017.
Office Action from Intellectual Property India in Indian Pat. Appl. No. 6720/CHENP/2013, dated Nov. 5, 2018.

* cited by examiner

FIG. 3C

| T1 | T2 | T3 |
|----|----|----|
| T4 | T5 | T6 |
| T7 | T8 | T9 |

– – – Dependent

——— Independent

FIG. 7A

| T1 | T2 | T3 |
|---|---|---|
| T4 | T5 | T6 |
| T7 | T8 | T9 |

FIG. 7B

| T1 | T4 | T7 |
|---|---|---|
| T2 | T5 | T8 |
| T3 | T6 | T9 |

FIG. 7C

| T4 | T5 | T6 |
|----|----|----|
| T1 | T2 | T3 |
| T7 | T8 | T9 |

FIG. 7D

| T4 | T1 | T7 |
|----|----|----|
| T5 | T2 | T8 |
| T6 | T3 | T9 |

FIG. 17A

| T1 | T2 | T3 |
|----|----|----|
| T4 | T5 | T6 |
| T7 | T8 | T9 |

FIG. 17B

| 1 | 2 | 3 | 4 | 5 | 16 | 17 | 18 | 19 | 20 | 31 | 32 | 33 | 34 | 35 |
|---|---|---|---|---|----|----|----|----|----|----|----|----|----|----|
| 6 | 7 | 8 | 9 | 10 | 21 | 22 | 23 | 24 | 25 | 36 | 37 | 38 | 39 | 40 |
| 11 | 12 | 13 | 14 | 15 | 26 | 27 | 28 | 29 | 30 | 41 | 42 | 43 | 44 | 45 |
| 46 | 47 | 48 | 49 | 50 | | | | | | | | | | |
| 51 | 52 | 53 | | | | | | | | | | | | |

☐ LCU

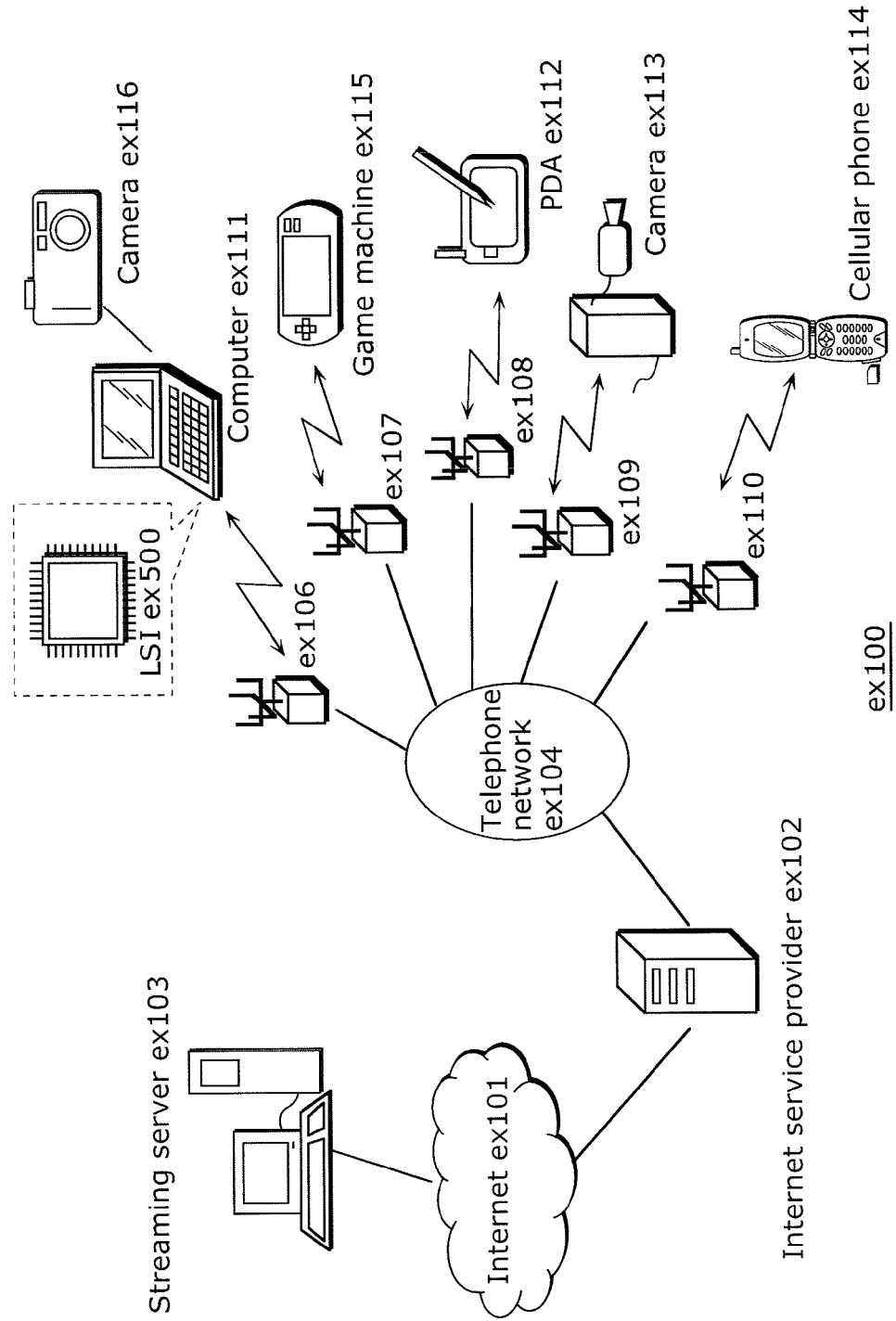

FIG. 24

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 35
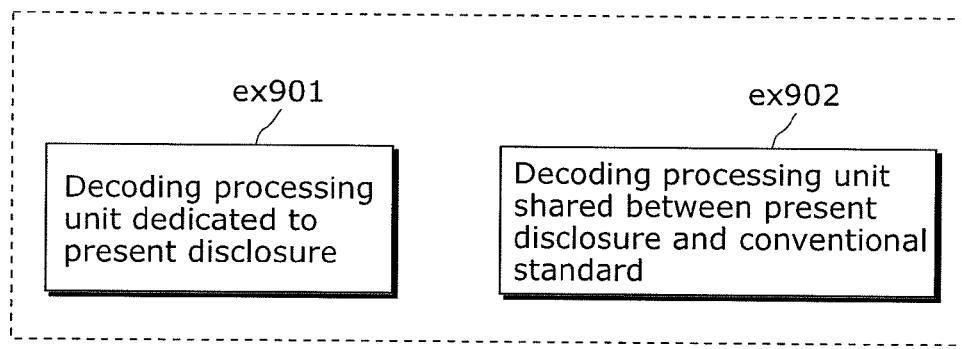
FIG. 36A
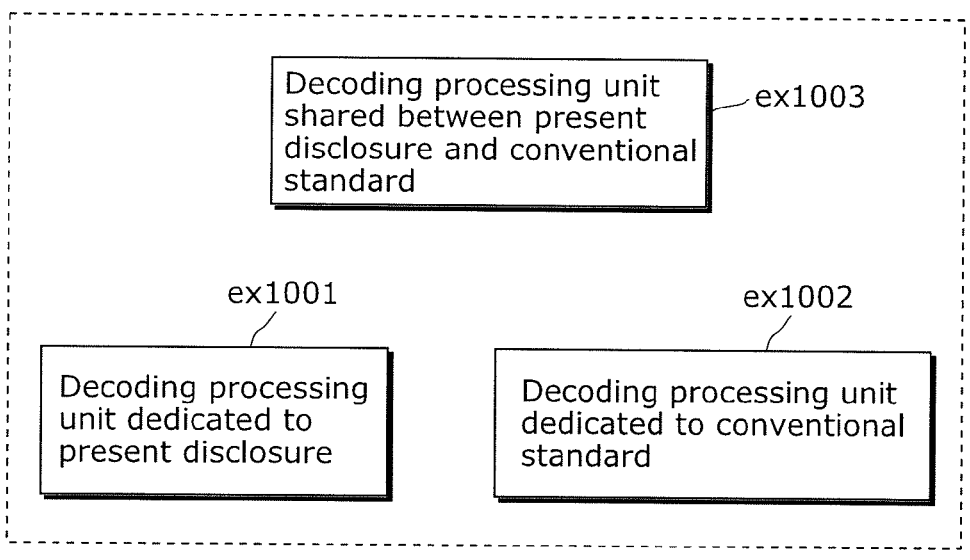
FIG. 36B

IMAGE CODING APPARATUS FOR CODING TILE BOUNDARIES

CROSS REFERENCE TO RELATED APPLICATION

This is a continuation of U.S. patent application Ser. No. 17/540,817, filed Dec. 2, 2021, which is a continuation of U.S. patent application Ser. No. 16/897,938, filed Jun. 10, 2020 and now U.S. Pat. No. 11,228,765, which is a continuation of U.S. patent application Ser. No. 16/530,137, filed Aug. 2, 2019 and now U.S. Pat. No. 10,715,808, which is a continuation of U.S. patent application Ser. No. 15/991,061, filed May 29, 2018 and now U.S. Pat. No. 10,412,389, which is a continuation of U.S. patent application Ser. No. 15/469,611, filed Mar. 27, 2017 and now U.S. Pat. No. 10,009,609, which is a continuation of U.S. patent application Ser. No. 15/142,007, filed Apr. 29, 2016 and now U.S. Pat. No. 9,648,328, which is a continuation of U.S. patent application Ser. No. 14/492,587, filed Sep. 22, 2014 and now U.S. Pat. No. 9,355,467, which is a continuation of U.S. patent application Ser. No. 14/090,592, filed Nov. 26, 2013 and now U.S. Pat. No. 8,879,860, which is a continuation of U.S. patent application Ser. No. 13/568,444, filed Aug. 7, 2012 and now U.S. Pat. No. 8,620,097, which claims the benefit of U.S. Prov. Pat. Appl. No. 61/522,382, filed Aug. 11, 2011. The disclosure of each of the above-mentioned documents, including the specification, drawings, and claims, is incorporated herein by reference in its entirety.

FIELD

The present disclosure relates to an image coding method, an image decoding method, an image coding apparatus, an image decoding apparatus, and an image coding and decoding apparatus.

BACKGROUND

H.264 is widely known as a standardized image coding method. In such an image coding method, slices are used as a technique of dividing and coding a picture. By using slices, an image decoding apparatus can decode the respective slices included in the picture independently.

Furthermore, in recent years, a coding technique called tiles has been proposed as a new technique for dividing and coding a picture (for example, see Non Patent Literature 1).

CITATION LIST

Non Patent Literature

[Non Patent Literature 1] "Tiles" (JCTVC-F355) Joint Collaborative Team on Video Coding (JCT-VC) of ITU-T SG16 WP3 and ISO/IEC JTC1/SC29/WG11 6th Meeting: Torino, IT, 14-22 Jul., 2011

[NON PATENT LITERATURE 2] "NEW RESULTS FOR PARALLEL DECODING FOR TILES" (JCTVC-F594) JOINT COLLABORATIVE TEAM ON VIDEO CODING (KT-VC) of ITU-T SG16 WP3 and ISO/IEC JTC1/SC29/WG11 6th Meeting: Torino, IT, 14-22 Jul., 2011

SUMMARY

Technical Problem

Demands for the reduction of processing load and improvement of coding efficiency have been placed on such an image coding method and image decoding method.

In view of this, non-limiting and exemplary embodiments provide image coding methods and image decoding methods that are capable of reducing processing load and improving coding efficiency.

Solution to Problem

An image coding method according to an aspect of the present disclosure includes: dividing a picture into tiles; coding the tiles to generate pieces of coded data each of which corresponds to a different one of the tiles; and generating a bitstream including the pieces of coded data, wherein the coding of the tiles includes: generating a first code string by coding a first tile which is one of the tiles, without referring to coding information used in coding another one of the tiles; and adding a bit string after the first code string to make a bit length of first coded data which is one of the pieces of coded data, a multiple of a predetermined N bits, N being an integer greater than or equal to 2.

It should be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure provides an image coding method and an image decoding method that are capable of reducing processing load and improving coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3C is a diagram showing an example of a tile division pattern according to Embodiment 1 of the present disclosure.

FIG. 7A is a diagram showing an example of a tile scanning order according to Embodiment 2 of the present disclosure.

FIG. 7B is a diagram showing an example of a tile scanning order according to Embodiment 2 of the present disclosure.

FIG. 7C is a diagram showing an example of a tile scanning order according to Embodiment 2 of the present disclosure.

FIG. 7D is a diagram showing an example of a tile scanning order according to Embodiment 2 of the present disclosure.

FIG. 17A is a diagram showing an example of a tile division pattern.

FIG. 17B is a diagram showing a processing order of blocks included in a tile.

FIG. 18 is a diagram of an overall configuration of a content providing system for implementing content distribution services.

FIG. 24 is a diagram illustrating a structure of multiplexed data.

FIG. 35 is a diagram illustrating an example of a look-up table in which video data standards are associated with driving frequencies.

FIG. 36A is a diagram illustrating an example of a configuration for sharing a module of a signal processing unit.

FIG. 36B is a diagram illustrating another example of a configuration for sharing a module of the signal processing unit.

DESCRIPTION OF EMBODIMENT(S)

Figure 1:
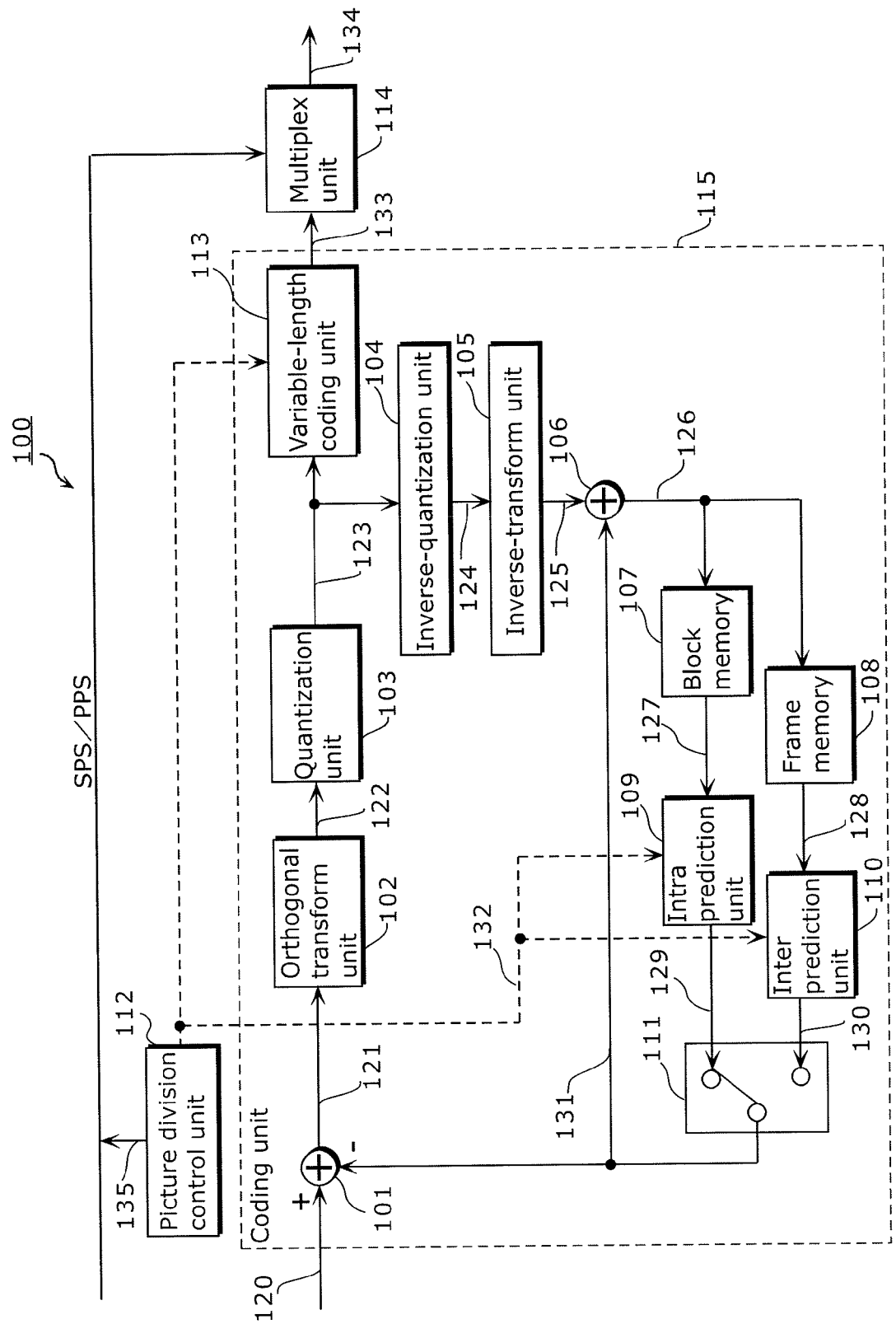
FIG. 1 is a block diagram of an image coding apparatus according to Embodiment 1 of the present disclosure.

(Underlying Knowledge Forming Basis of the Present Disclosure)

First, the tiles shall be described using FIG. 17A and FIG. 17B. A picture is divided into an arbitrary number of columns and rows. Then, each region that is surrounded by boundaries is called a tile.

FIG. 17A shows an example in which a picture is divided into three columns and three rows. As a result of the division, nine tiles, T1 to T9, are present in the picture. The column width can be set to a different value per column, with the largest coding unit (LCU) as a unit. Furthermore, an identical width can also be set for all the columns. In the same manner, the row height (the vertical width of the tiles) can be set to a different value per row, with the LCU as a unit. Furthermore, an identical height can also be set for all the rows.

When coding a picture, tiles are processed in raster scan order in the picture. Specifically, the tiles are processed in number order, from tile T1 at the upper left, to T2, T3, up to T9 at the lower right.

FIG. 17B shows an example of LCUs included in the respective tiles. Each of the tiles includes one or more LCUs. For example, the tile T1 includes the 16 LCUs from number 1 to number 15. When coding a picture, LCUs are processed in raster scan order in the picture. As described above, tiles are processed in raster scan order in the picture, and thus the LCUs are processed in an order such as from number 1 to number 53 as shown in FIG. 17B.

In this manner, when a picture is divided into tiles, there are cases where the processing order of LCUs changes compared to when the picture is not divided. On the other hand, when a picture is divided into slices, the processing order of LCUs does not change compared to when the picture is not divided. In this manner, using tiles allows for arbitrary division and optimal setting of processing order, and thus coding efficiency can be improved compared to when slices are used.

Furthermore, when coding the current LCU to be processed, normally, the coding information of neighboring LCUs of the current LCU is used. For example, in intra prediction and motion vector prediction, the information of the neighboring LCUs of the current LCU is referred to, and such information is used in the coding of the current LCU. In other words, the current LCU is dependent on the neighboring LCUs. In general, prediction accuracy increases with a larger number of LCUs that can used as reference. Accordingly, coding efficiency improves. However, an LCU that is dependent on another LCU cannot be decoded separately from the LCU on which it is dependent.

Furthermore, a flag (tile boundary independence flag: tile_boundary_independence_idc) indicating coding dependence relationship at the boundary of the tiles is provided. This tile boundary independence flag is allocated 1 bit. In addition, the tile boundary independence flag is sent to the image decoding apparatus by being included in a sequence parameter set (SPS) or a picture parameter set (PPS).

When the tile boundary independence flag is ON, the respective tiles are independent. Specifically, when coding a certain LCU in the tile, it is not possible to refer to coding information of LCUs beyond the boundaries of the tile, and only the coding information of LCUs within the tile is used in prediction. In contrast, when the tile boundary independence flag is OFF, the respective tiles are in a dependence relationship. In other words, the information of all LCUs included in the tile in which the current LCU is included and the other tiles, which are in a usable relationship, can be used in the coding.

It should be noted that a tile may include more than one slice, and a slice may include more than one tile. However, when a slice includes more than one tile, the LCUs belonging to the same slice are present across plural tiles. As a result, coding independence of tile pairs cannot be maintained, and the tile boundary independence flag must be turned OFF.

Demands for the reduction of processing load and improvement of coding efficiency have been placed on such an image coding method and image decoding method.

In view of this, an image coding method, an image decoding method, an image coding apparatus, and an image decoding apparatus that are capable of reducing processing load or improving coding efficiency shall be described in these embodiments.

In order to solve such a problem, an image coding method according to an aspect of the present disclosure includes: dividing a picture into tiles; coding the tiles to generate pieces of coded data each of which corresponds to a different one of the tiles; and generating a bitstream including the pieces of coded data, wherein the coding of the tiles includes: generating a first code string by coding a first tile which is one of the tiles, without referring to coding information used in coding another one of the tiles; and adding a bit string after the first code string to make a bit length of first coded data which is one of the pieces of coded data, a multiple of a predetermined N bits, N being an integer greater than or equal to 2.

Accordingly, the coded data of each tile becomes a multiple of a predetermined number of bits. Therefore, it becomes easy to handle coded data in the image decoding apparatus. Furthermore, the image decoding apparatus can easily identify the lead position of the coded data of a tile. In this manner, the image coding method can reduce the processing load of an image decoding apparatus.

For example, the generating of a first code string may include performing arithmetic coding to generate the first code string, and in the performing of arithmetic coding, termination which concludes the first code string may be performed.

Accordingly, an image decoding apparatus can handle the coded data of each tile independently.

For example, in the dividing, boundaries between the tiles may be classified into a first boundary or a second boundary, in the coding of the tiles, each tile may be coded by referring to coding information of a tile located across the first boundary without referring to coding information of a tile located across the second boundary, among coded ones of the tiles neighboring the each tile, and in the generating of a bitstream, the bitstream including tile boundary independence information may be generated, the tile boundary independence information indicating whether each of the boundaries is the first boundary of the second boundary.

Accordingly, the dependence relationships for tile pairs are set on a tile boundary basis. Therefore, coding efficiency is improved compared to when the tile pair dependence relationships are set, for example, on a picture basis.

For example, the tile boundary independence information may be included in a picture parameter set or a sequence parameter set included in the bitstream.

For example, in the dividing, a coding order of the tiles may be determined, in the coding of the tiles, the tiles may be coded in the determined coding order, and in the generating of a bitstream, the bitstream including tile processing order information indicating the coding order may be generated.

Accordingly, the tile decoding order in an image decoding apparatus can be arbitrarily set. Therefore, for example, among the images of regions included in a picture, the image of a region having a high priority can be decoded ahead in the image decoding apparatus.

For example, the tile processing order information may be included in a picture parameter set or a sequence parameter set included in the bitstream.

For example, in the generating of a bitstream, a marker may be inserted only at a data boundary for which a boundary between two of the tiles respectively corresponding to two of the pieces of coded data located at opposite sides of the data boundary is a second boundary, among data boundaries of the pieces of coded data, the marker identifying the data boundary.

Accordingly, the image coding method can improve coding efficiency compared to when markers are inserted at all tile boundaries.

Furthermore, an image decoding method according to an aspect of the present disclosure includes: obtaining pieces of coded data included in a bitstream and generated by coding tiles obtained by dividing a picture; and decoding the pieces of coded data to generate image data of the tiles, wherein the decoding of the pieces of coded data includes: generating image data of a first tile which is one of the tiles by decoding a first code string included in first coded data without referring to decoding information used in decoding another one of the tiles, the first coded data being one of the pieces of coded data; and skipping a predetermined bit string located after the first code string in the first coded data.

Accordingly, the image decoding method can easily identify the lead position of the coded data of a tile. In this manner, the image decoding method can reduce the processing load of an image decoding apparatus.

For example, the generating of image data may include performing arithmetic decoding on the first code string, and the performing of arithmetic decoding may include, prior to the skipping, performing termination which concludes the arithmetic decoding on the first code string.

Accordingly, an image decoding apparatus can handle the coded data of each tile independently.

For example, the decoding of the pieces of coded data may include generating image data of a second tile which is one of the tiles, by decoding a second code string included in second coded data which is located after the first coded data in the pieces of coded data.

Furthermore, an image coding apparatus according to an aspect of the present disclosure includes: a division unit configured to divide a picture into tiles; a coding unit configured to code the tiles to generate pieces of coded data each of which corresponds to a different one of the tiles; and a bitstream generation unit configured to generate a bitstream including the pieces of coded data, wherein the coding unit is configured to: generate a first code string by coding a first tile which is one of the tiles without referring to coding information used in coding another one of the tiles; and add a bit string after the first code string to make a bit length of first coded data which is one of the pieces of coded data, a multiple of a predetermined N bits, N being an integer greater than or equal to 2.

Accordingly, the coded data of each tile becomes a multiple of a predetermined number of bits. Therefore, it becomes easy to handle coded data in the image decoding apparatus. Furthermore, the image decoding apparatus can easily identify the lead position of the coded data of a tile. In this manner, the image coding apparatus is capable of reducing the processing load of an image decoding apparatus.

Furthermore, an image decoding apparatus according to an aspect of the present disclosure includes: a parsing unit configured to obtain pieces of coded data included in a bitstream and generated by coding tiles obtained by dividing a picture; and a decoding unit configured to decode the coded data to generate image data of the tiles, wherein the decoding unit is configured to: generate image data of a first tile which is one of the tiles by decoding a first code string included in first coded data without referring to decoding information used in decoding another one of the tiles, the first coded data being one of the pieces of coded data; and skip a predetermined bit string located after the first code string in the first coded data.

Accordingly, the image decoding apparatus is capable of easily identifying the lead position of the coded data of a tile. In this manner, the image decoding apparatus is capable of reducing the processing load.

Furthermore, an image coding and decoding apparatus according to an aspect of the present disclosure includes: the image coding apparatus; and an image decoding apparatus including: a parsing unit configured to obtain pieces of coded data included in a bitstream and generated by coding tiles obtained by dividing a picture; and a decoding unit configured to decode the coded data to generate image data of the tiles, wherein the decoding unit is configured to: generate image data of a first tile which is one of the tiles by decoding a first code string included in first coded data without referring to decoding information used in decoding another one of the tiles, the first coded data being one of the pieces of coded data; and skip a predetermined bit string located after the first code string in the first coded data.

It should be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments of the present disclosure shall be described with reference to the Drawings.

It is to be noted that each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the appended claims. Therefore, among the structural elements in the following exemplary embodiments, structural elements not recited in any one of the independent claims defining the most generic concept are described as arbitrary structural elements.

Embodiment 1

As described above, when tile pair dependence relationships are set on a picture basis, the dependence relationships of all the tile pairs in the picture are cut according to such setting. With this, the inventors have found that there is the problem that coding efficiency deteriorates.

In contrast, in the image coding apparatus according to this embodiment, the tile pair dependence relationships are set on a tile boundary basis. With this, the image coding apparatus is capable of improving coding efficiency compared to when the tile pair dependence relationships are set on a picture basis.

FIG. 1 is a block diagram showing the configuration of an image coding apparatus 100 which uses the image coding method according to this embodiment.

The image coding apparatus 100 shown in FIG. 1 codes an input image signal 120 to generate a coded image signal 134. The image coding apparatus 100 includes a coding unit 115, a picture division control unit 112, and a multiplex unit 114. Furthermore, the coding unit 115 includes a subtractor 101, an orthogonal transform unit 102, a quantization unit 103, an inverse-quantization unit 104, an inverse-orthogonal transform unit 105, an adder 106, a block memory 107, a frame memory 108, an intra prediction unit 109, an inter prediction unit 110, a picture type determination unit 111, and a variable-length coding unit 113.

The picture division control unit 112, which is an example of the division unit, divides a picture into more than one tile and determines the tile pair dependence relationship at the respective tile boundaries. Subsequently, the picture division control unit 112 transmits, to the multiplex unit 114, picture division information 135 which is information regarding the tile division. Specifically, the picture division information 135 indicates the picture division pattern and the tile pair dependence relationships.

Furthermore, the picture division control unit 112 transmits the picture division information 135 to the multiplexing unit 114, as a part of a sequence parameter set (SPS) or picture parameter set (PPS). The picture parameter set is a parameter set corresponding to the header of a picture. The sequence parameter set is a parameter set corresponding to a header that can be used in common for one or more pictures. The picture parameter set includes the type of the variable-length coding, the initial value of the quantization step, the number of reference pictures, and so on. The sequence parameter set includes the maximum number of pictures that can be referred to, the image size, video display information (VUI: Video Usability Information), and so on.

Furthermore, the picture division control unit 112 generates, based on the picture division pattern and the tile pair dependence relationships, a division control signal 132 for controlling the intra prediction unit 109, the inter prediction unit 110, and the variable-length coding unit 113.

The coding unit 115 codes the input image signal 120 to generate coded data 133.

The subtractor 101 calculates the difference between predicted image data 131 generated by a processing unit described later and the input image signal 120 to generate prediction error data 121. The orthogonal transform unit 102 transforms the prediction error data 121, from an image domain to a frequency domain, to generate transform coefficients 122. The quantization unit 103 quantizes the transform coefficients 122 to generate quantized coefficients 123.

The inverse quantization unit 104 inverse-quantizes the quantized coefficients 123 to generate transformed coefficients 124. The inverse-orthogonal transform unit 105 transforms the transformed coefficients 124, from the frequency domain to the image domain, to generate prediction error data 125. The adder 106 adds up the predicted image data 131 and the prediction error data 125 to generate decoded image data 126. The block memory 107 stores the decoded image data 126, in block-units, as decoded image data 127. The frame memory 108 stores the decoded image data 126, in frame-units, as decoded image data 128.

The intra prediction unit 109 performs intra prediction using a block-unit of the decoded image data 127 stored in the block memory 107, to generate predicted image data 129 of the current block. Furthermore, the intra prediction unit 109 detects the tile pair dependence relationships, based on the division control signal 132 sent from the picture division control unit 112. Then, the intra prediction unit 109 performs intra prediction without using the image information of a block included in a tile whose dependence relationship with the current tile to be processed is cut.

The inter prediction unit 110 performs inter prediction using a frame-unit of the decoded image data 128 stored in the frame memory 108, to generate predicted image data 130 of the current block. Furthermore, the inter prediction unit 110 detects the tile pair dependence relationships, based on the division control signal 132 sent from the picture division control unit 112. Then, the inter prediction unit 110 performs motion vector prediction without using the motion vector information of a block included in a tile whose dependence relationship with the current tile is cut.

The variable-length coding unit 113 performs variable-length coding on the quantized coefficients 123 to generate coded data 133. The variable-length coding unit 113 detects the tile pair dependence relationships, based on the division control information 132 sent from the picture division control unit 112. In addition, the variable-length coding unit 113 resets the entropy coding at a tile boundary in which the dependence relationship is cut.

The multiplex unit 114, which is an example of the bitstream generation unit, obtains a picture parameter set or a sequence parameter set that is included in the picture division information 135, and multiplexes the parameters with the coded data 133 to generate a bitstream 134.

Figure 2:
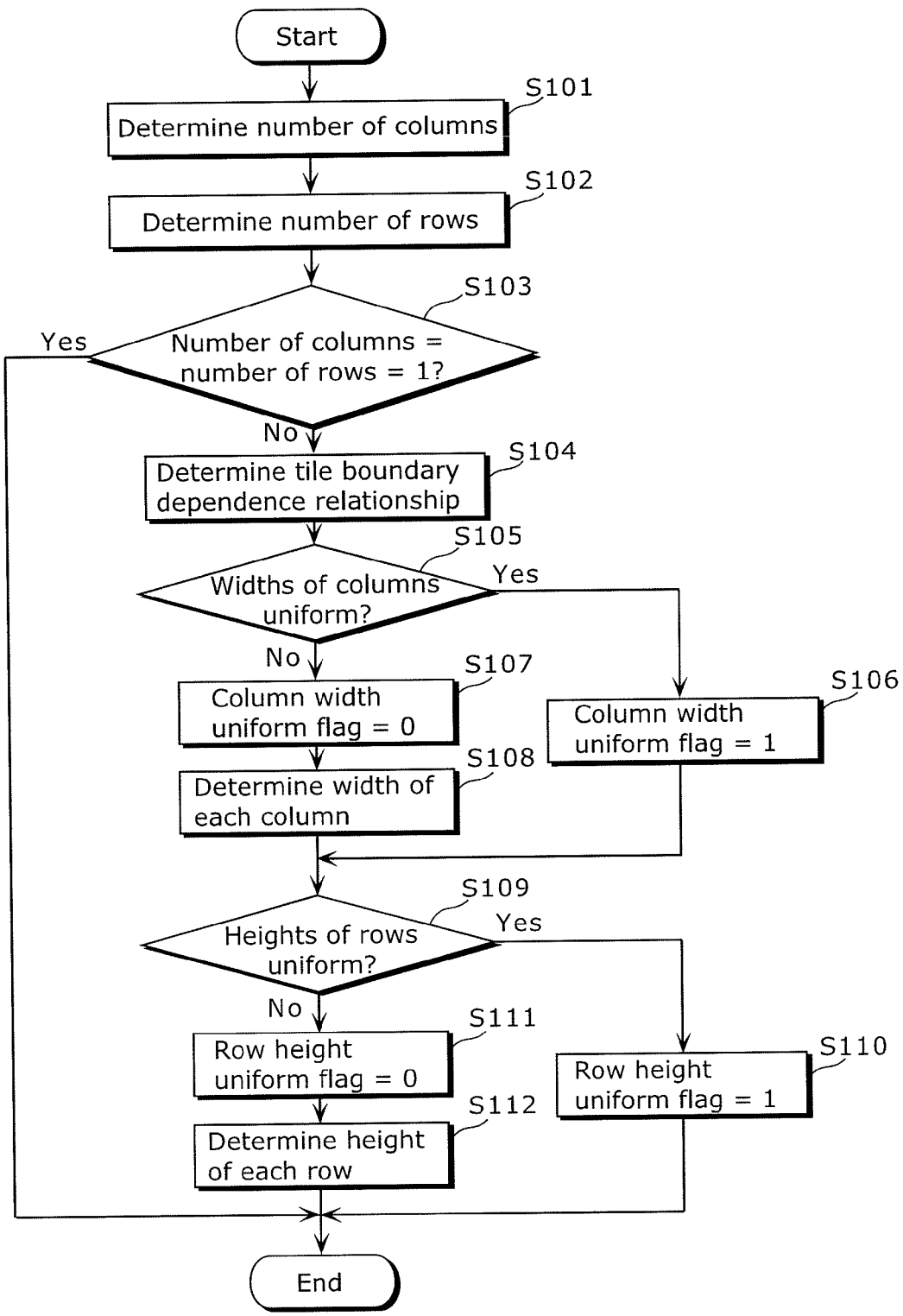
FIG. 2 is a flowchart of picture division according to Embodiment 1 of the present disclosure.

Hereinafter, the process of dividing a picture into tiles according to the picture division control unit 112 shall be described. FIG. 2 is a flowchart of the picture dividing by the picture division control unit 112 according to this embodiment.

First, the picture division control unit 112 determines the number of columns which is the number of columns of tiles (S101). Next, the picture division control unit 112 determines the number of rows which is the number of rows of tiles (S102). Next, the picture division control unit 112 determines whether or not both the determined number of columns and number of rows are 1 (S103). Specifically, the picture division control unit 112 determines whether or not the picture can be divided into tiles. When both the number of columns and the number of rows are 1 (Yes in S103), that is, when the picture cannot be divided into tiles, the picture division control unit 112 ends the process.

On the other hand, when at least one of the number of columns and the number of rows is 2 or more (No in S103), that is, when the picture can be divided into tiles, the picture division control unit 112 determines the coding dependency relationship at the tile boundary, and generates tile boundary independence information indicating the determined dependence relationship (S104).

Next, the picture division control unit 112 determines the width of each column (the horizontal width of the tiles), using the Largest Coding Unit as a unit. Specifically, first, the picture division control unit 112 determines whether or not to set the same width for all the columns included in the picture (S105). When the widths of all the columns are set to be the same (Yes in S105), the picture division control unit 112 sets a column width uniform flag to "1" (S106). On the other hand, when the widths of the columns are different within the picture (No in S105), the picture division control unit 112 sets the column width uniform flag to "0" (S107), and determines the width for each column (S108).

Next, the picture division control unit 112 determines the height of the rows, with the LCU as a unit. Specifically, first, the picture division control unit 112 determines whether or not to set the same height to all the rows included in the picture (S109). When the heights of all the rows are the same (Yes in S109), the picture division control unit 112 sets a row height uniform flag to "1" (S110). On the other hand, when the heights of the columns are different within the picture (No in S109), the picture division control unit 112 sets the row height uniform flag to "0" (S111), and determines the height for each row (S112).

In such manner, the picture division control unit 112 divides a picture into tiles. Then, the picture division control unit 112 generates picture division information 135 which includes information indicating the picture division pattern as well as the tile boundary independence information, and transmits, to the multiplex unit 114, the generated picture division information 135 as part of the sequence parameter set (SPS) or the picture parameter set (PPS). Here, the information indicating the picture division pattern includes, for example, the number of columns, the number of rows, the column width uniform flag, and the row height uniform flag. Furthermore, such information includes, as necessary, the column width or the row height.

Figure 3A:
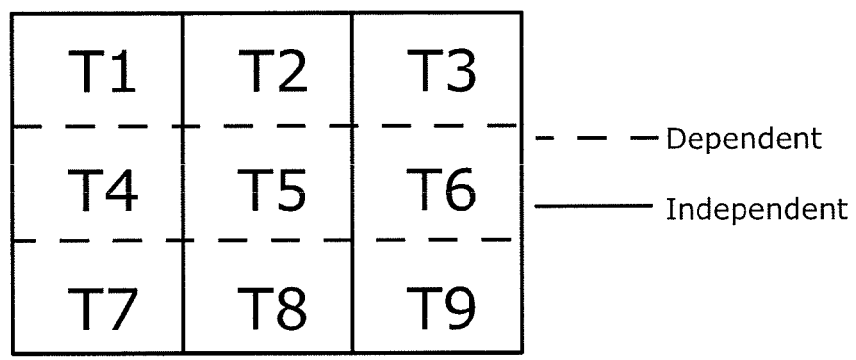
FIG. 3A is a diagram showing an example of a tile division pattern according to Embodiment 1 of the present disclosure.
Figure 3B:
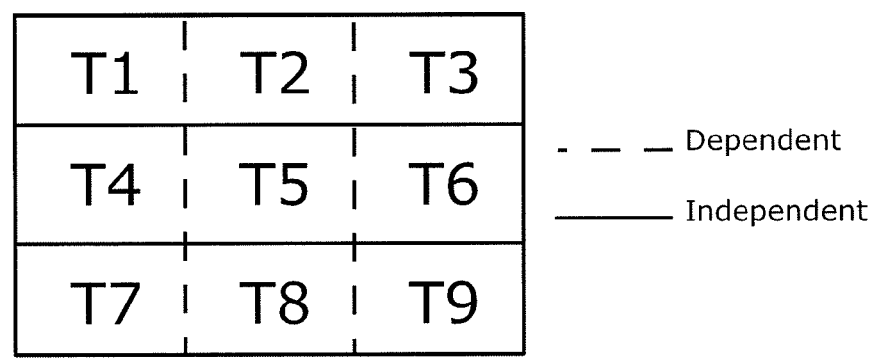
FIG. 3B is a diagram showing an example of a tile division pattern according to Embodiment 1 of the present disclosure.

FIG. 3A to FIG. 3C are diagrams showing examples of patterns in the division of a picture into tiles. A broken line in FIG. 3A to FIG. 3C indicates that the tiles on both sides of a boundary are dependent, and a solid line indicates that the tiles on both sides of the tile boundary are independent of each other, that is, their dependence relationship is cut. Specifically, when two tiles are in a dependence relationship, the image coding apparatus 100 codes one of the tiles by referring to the coding information of the other. Furthermore, when two tiles are independent of each other, the image coding apparatus 100 codes one of the tiles without referring to the coding information of the other. Here, coding information is information that is used in coding, and is specifically the pixel information (pixel value) in intra prediction as well as the motion vector information in inter prediction. In the subsequent description, when two tiles are in a dependence relationship, it is said that the two tiles (tile pair) are dependent, and when the dependence relationship between two tiles is cut, it is said that the two tiles (tile pair) are independent. Furthermore, when the tiles on both sides of a boundary are dependent, the boundary is said to be dependent, and when the tiles on both sides of the tile boundary are independent, the boundary is said to be independent.

In FIG. 3A, tile pairs in the vertical direction (for example, the pair of T1 and T4) are dependent, and tile pairs in the horizontal direction (for example, the pair of T1 and T2) are independent. Furthermore, the tile dependence relationship at the tile boundary is indicated using tile boundary independence information for which 2 bits are allocated. For example, the first bit indicates the tile pair dependence relationships in the horizontal direction, and the second bit indicates the tile pair dependence relationships in the vertical direction. A bit is set to "1" when tiles are independent, and the bit is set to "0" when tiles are dependent. In this case, the tile boundary independence information for FIG. 3A is "0b10".

In FIG. 3B, tiles in the horizontal direction are independent, and tiles in the vertical direction are independent. Therefore, the tile boundary independence information is "0b01". It should be noted that the tile boundary independence information is "0x11" when all the tile pairs are independent, and the tile boundary independence information is "0b00" when all the tile pairs are dependent.

In FIG. 3C the tile pair dependence relationship is different at each tile boundary. Even for tile pairs in the vertical direction, tile T1 and tile T4 are independent while tile T2 and T5 are dependent. It should be noted that FIG. 3(c) is one example, and the tile pair dependence relationship during coding and decoding may be set arbitrarily for each boundary of neighboring tiles.

Figure 4A:
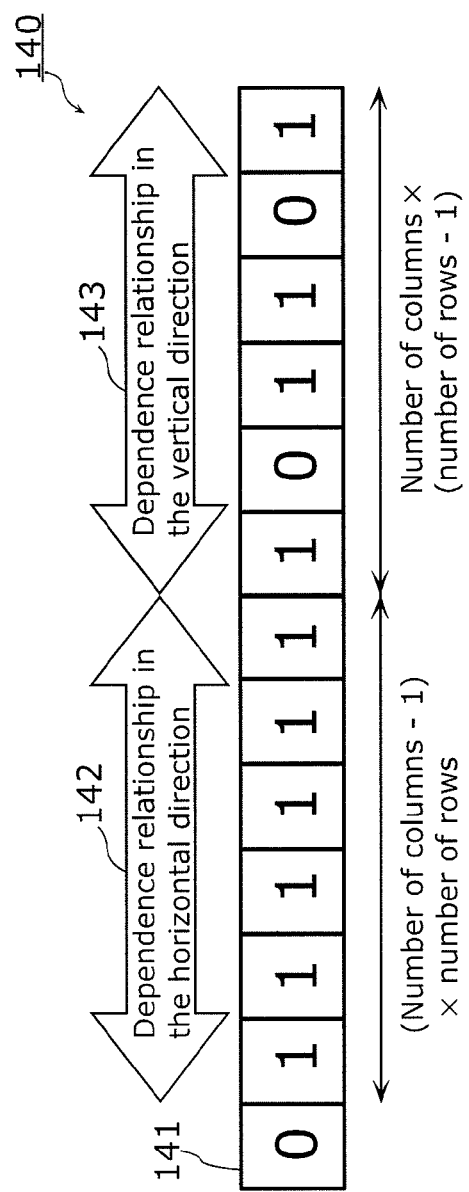
FIG. 4A is a diagram showing an example of tile boundary independence information according to Embodiment 1 of the present disclosure.
Figure 4B:
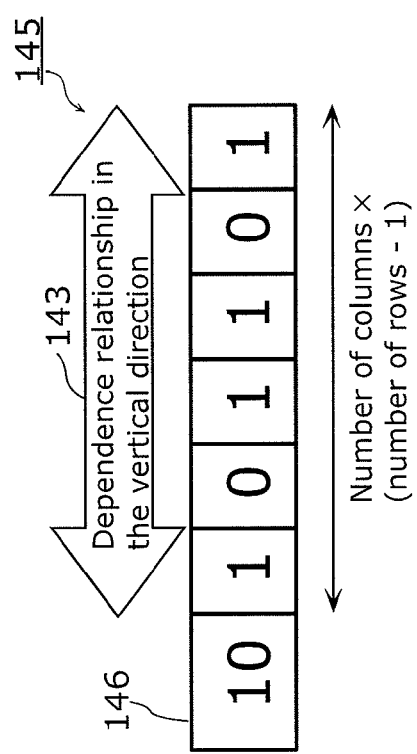
FIG. 4B is a diagram showing an example of tile boundary independence information according to Embodiment 1 of the present disclosure.

FIG. 4A and FIG. 4B are diagrams showing tile boundary independence information when setting the tile pair dependence relationships on a tile boundary basis. Tile boundary independence information 140 shown in FIG. 4A includes: 1 bit of overall dependence information 141 indicating the overall tile pair dependence relationship; multiple bits ((number of columns−1)×number of rows) of horizontal dependence information 142 indicating the tile pair dependence relationship in the horizontal direction; and multiple bits (number of columns×(number of rows−1)) of vertical dependence information 143 indicating the tile pair dependence relationship in the vertical direction. Furthermore, FIG. 4A and FIG. 4B are examples of tile boundary independence information in the case of the dependence relationship shown in FIG. 3C.

The respective bits included in the horizontal dependence information 142 indicate sequentially, from the lead bit, the dependence relation between T1 and T2, the dependence relation between T2 and T3, the dependence relation between T3 and T4, the dependence relation between T4 and T5, the dependence relation between T5 and T6, the dependence relation between T6 and T7, the dependence relation between T7 and T8, and the dependence relation between T8 and T9. Furthermore, the respective bits included in the vertical dependence information 143 indicate sequentially, from the lead bit, the dependence relation between T1 and T4, the dependence relation between T2 and T5, the dependence relation between T3 and T6, the dependence relation between T4 and T7, the dependence relation between T5 and T8, and the dependence relation between T6 and T9.

In the example in FIG. 3C, because T2 and T5, and T5 and T8 are dependent, the second bit and fifth bit from the lead bit of the vertical dependence information 143 are set to "0" in the tile boundary independence information 140 shown in FIG. 4A. It should be noted that when all the tile pairs are independent, the leading 1 bit of the overall dependence information 141 is set to "1", and the horizontal dependence information 142 and the vertical dependence information 143 are omitted.

FIG. 4B is a diagram showing another example of tile boundary independence information. Tile boundary independence information 145 shown in FIG. 4B includes: 2 bits of overall dependence information 146 indicating the tile pair dependence relationships; multiple bits ((number of columns−1)×number of rows) of the horizontal dependence information 142 indicating the tile pair dependence relationships in the horizontal direction; and multiple bits (number of columns×(number of rows−1)) of the vertical dependence information 143 indicating the tile pair dependence relationships in the vertical direction. Here, the leading two bits of the tile boundary independence information 146 are the tile boundary independence information used in FIG. 3A and FIG. 3A. Specifically, the first bit of the tile boundary independence information 146 indicates the tile pair dependence relationships in the horizontal direction, and the second bit indicates the tile pair dependence relationships in the vertical direction. It should be noted that the horizontal dependence information 142 and the vertical dependence information 143 are the same as those described in FIG. 4A. In the example in FIG. 3C, the tile pairs in the horizontal direction are independent. Therefore, the overall dependence information 146 is "0b10". Furthermore, since the tile pairs in the horizontal direction are independent, the horizontal dependence information 142 is omitted. Specifically, when the dependence relationship between all the tile pairs in the horizontal direction is independent in the tile boundary independence information 145 shown in FIG. 4B, the horizontal dependence information 142 is omitted. Furthermore, when the dependence relationship between all the tile pairs in the vertical direction is independent, the vertical dependence information 143 is omitted. With this, the number of bits of the tile boundary independence information 145 can be reduced.

Here, one of the advantages of dividing a picture is that it makes parallel processing possible. For example, in FIG. 3A to FIG. 3C, the picture is divided into nine tiles, and when all the tiles are independent, the image coding apparatus and the image decoding apparatus can code or decode the nine tiles in parallel. In the coding and decoding of high definition images called Super Hi-Vision and Ultra High Definition Television (UHDTV) which exceed the level of definition in Hi-Vision, computation load is high and real-time processing is difficult As such, when coding and decoding high definition images, the need for parallel processing is particularly high. On the other hand, in coding, prediction accuracy deteriorates the more the dependence relationships of tile pairs are cut. Accordingly, coding efficiency deteriorates. Therefore, cutting dependence relationships of tire pairs beyond what is necessary is undesirable from the point of coding efficiency.

For example, it is assumed that the image coding apparatus and the image decoding apparatus can use up to three processors and 3-parallel processing can be performed. In this situation, even in the case of division into nine tiles as shown in FIG. 3A to FIG. 3C, it is sufficient to set the independent tile groups (groups each including one or more tiles) to 3 which is equivalent to the number of processors with which parallel processing is possible. Dividing the picture into more than three independent tile groups leads to unnecessary reduction in coding efficiency. Specifically, when the tile pair dependence relationships (making tile pairs dependent or independent) are set on a picture basis, even when the image coding apparatus or the image decoding apparatus is only capable of 3-parallel processing, the dependence relationships of all the tile pairs in the picture are cut. This leads to deterioration of coding efficiency.

On the other hand, according to this embodiment, the dependence relationship of tile pairs can be set on a boundary basis. With this, for example, it is possible to generate independent tile groups matching the number of parallels that the image coding apparatus or image decoding apparatus are able to parallel process. Therefore, the image coding apparatus 100 according to this embodiment is capable of suppressing the deterioration of coding efficiency and performing parallel processing of an arbitrary number of parallels. In this manner, the image coding apparatus 100 according to this embodiment is capable of improving coding efficiency.

As described above, in the image coding apparatus 100 according to this embodiment, the picture division control unit 112 divides a picture into tiles. The coding unit 115 codes the respective tiles to generate pieces of coded data 133 each corresponding to a different one of the tiles. The multiplex unit 114 generates a bitstream including the pieces of coded data 133.

In addition, the picture division control unit 112 classifies each boundary between respective pairs of tiles, among the plural tiles, into a first boundary (dependent) and a second boundary (independent). For each of the tiles, the coding unit 115 codes the tile by referring to the coding information of a tile that is located across a first boundary, and without referring to the coding information of a tile located across a second boundary, among the coded tiles neighboring the tile to be coded. Furthermore, the multiplex unit 114 generates the bitstream 134 including tile boundary independence information indicating whether each of the tile pair boundaries of the plural tiles is a first boundary or a second boundary.

This allows the dependence relationship between tiles to be set for on a tile pair boundary basis. Therefore, coding efficiency is improved compared to when the dependence relationships of the tiles are set, for example, on a picture basis.

Hereinafter, the image decoding apparatus according to this embodiment shall be described.

Figure 5:
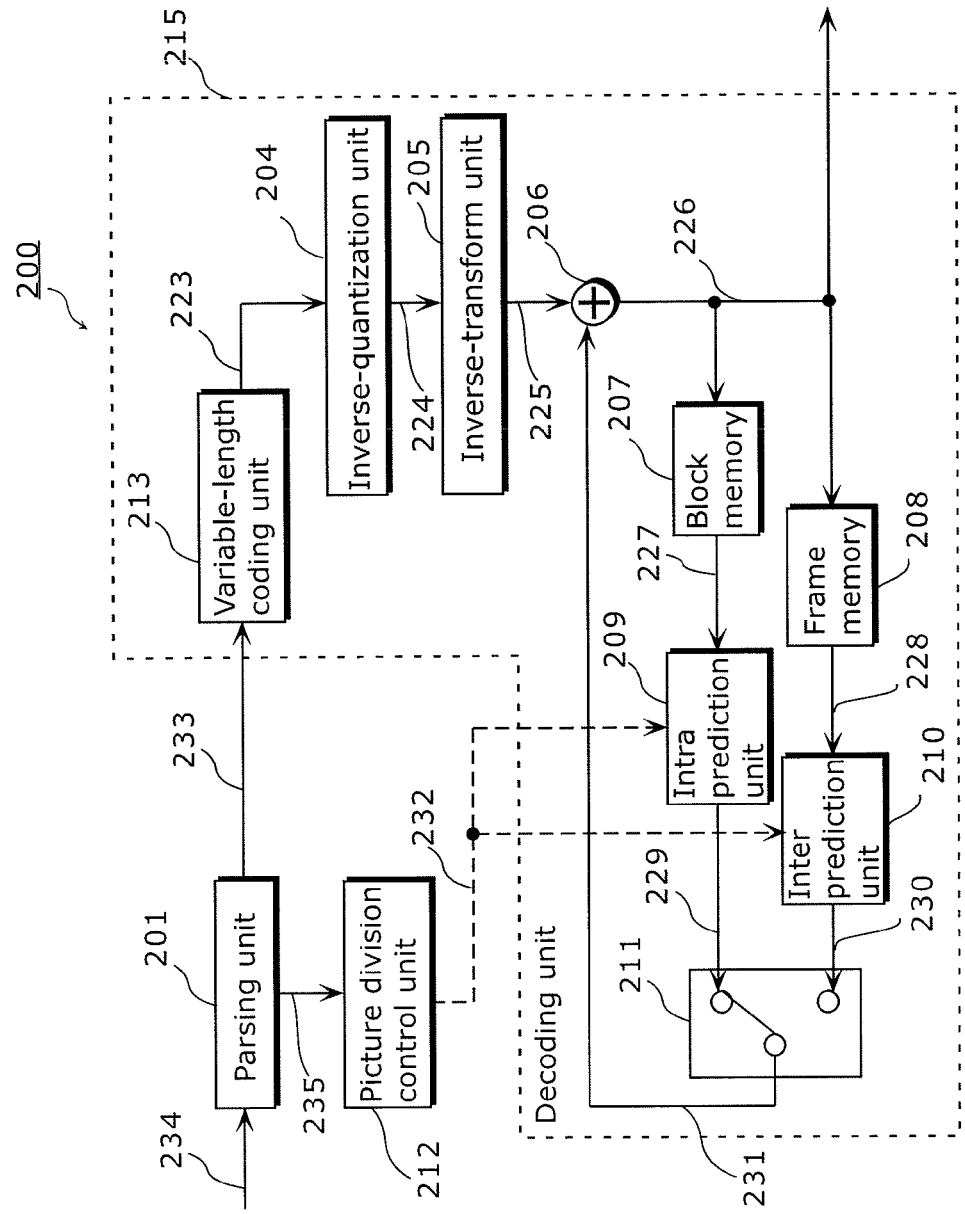
FIG. 5 is a block diagram of an image decoding apparatus according to Embodiment 1 of the present disclosure.

FIG. 5 is a block diagram of an image decoding apparatus 200 which uses the image decoding method according to this embodiment.

The image decoding apparatus 200 shown in FIG. 5 decodes a bitstream 234 to generate decoded image data 226. The image decoding apparatus 200 includes a decoding unit 215, a parsing unit 201, and a picture division control unit 212. Furthermore, the decoding unit 215 includes an inverse-quantization unit 204, an inverse-orthogonal transform unit 205, an adder 206, a block memory 207, a frame memory 208, an intra prediction unit 209, an inter prediction unit 210, a picture type determination unit 211, and a variable-length decoding unit 213.

Here, the bitstream 234 corresponds to the bitstream 134 generated by the above-described image coding apparatus 100.

The parsing unit 201 parses the bitstream 234 to obtain coded data 233 and picture division information 235 which is included in a sequence parameter set or a picture parameter set of the bitstream 234. The picture division information 235 corresponds to the above-described picture division information 135, and indicates the picture division pattern and the tile pair dependence relationships.

Based on the picture division pattern and the tile pair dependence relationships which are indicated by the picture division information 235, the picture division control unit 212 generates a division control signal 232 for controlling the intra prediction unit 209, the inter prediction unit 210, and the variable-length decoding unit 213.

The decoding unit 215 decodes the coded data 233 to generate decoded image data 226.

The variable-length decoding unit 213 performs variable-length decoding on the coded data 233 to generate quantized coefficients 223.

The inverse quantization unit 204 inverse-quantizes the quantized coefficients 223 to generate transformed coefficients 224. The inverse-orthogonal transform unit 205 transforms the transformed coefficients 224, from the frequency domain to the image domain, to generate prediction error data 225. The adder 206 adds up predicted image data 231 and the prediction error data 225 to generate decoded image data 226. The block memory 207 stores the decoded image data 226, in block-units, as decoded image data 227. The frame memory 208 stores the decoded image data 226, in frame-units, as decoded image data 228.

The intra prediction unit 209 performs intra prediction using a block-unit of the decoded image data 227 stored in the block memory 207, to generate predicted image data 229 of the current block to be decoded. Furthermore, the intra prediction unit 209 detects the tile pair dependence relationships, based on the division control signal 232 sent from the picture division control unit 212. Then, the intra prediction unit 209 performs intra prediction without using the image information of a block included in a tile whose dependence relationship is cut.

The inter prediction unit 210 performs inter prediction using a frame-unit of the decoded image data 228 stored in the frame memory 208, to generate predicted image data 230 of the current block. Furthermore, the inter prediction unit 210 detects the tile pair dependence relationships, based on the division control signal 232 sent from the picture division control unit 212. Then, the inter prediction unit 210 performs motion vector prediction without using the motion vector information of a block included in a tile whose dependence relationship is cut.

According to the above-described configuration, the image decoding apparatus 200 according to this embodiment is capable of decoding the bitstream generated by the above-described image coding apparatus 100.

Embodiment 2

In this embodiment, a modification of the previously-described image coding apparatus 100 according to Embodiment 1 shall be described. It is to be noted that, hereinafter, description shall be carried out primarily on the points of difference with Embodiment 1 and overlapping description shall be omitted.

Figure 6:
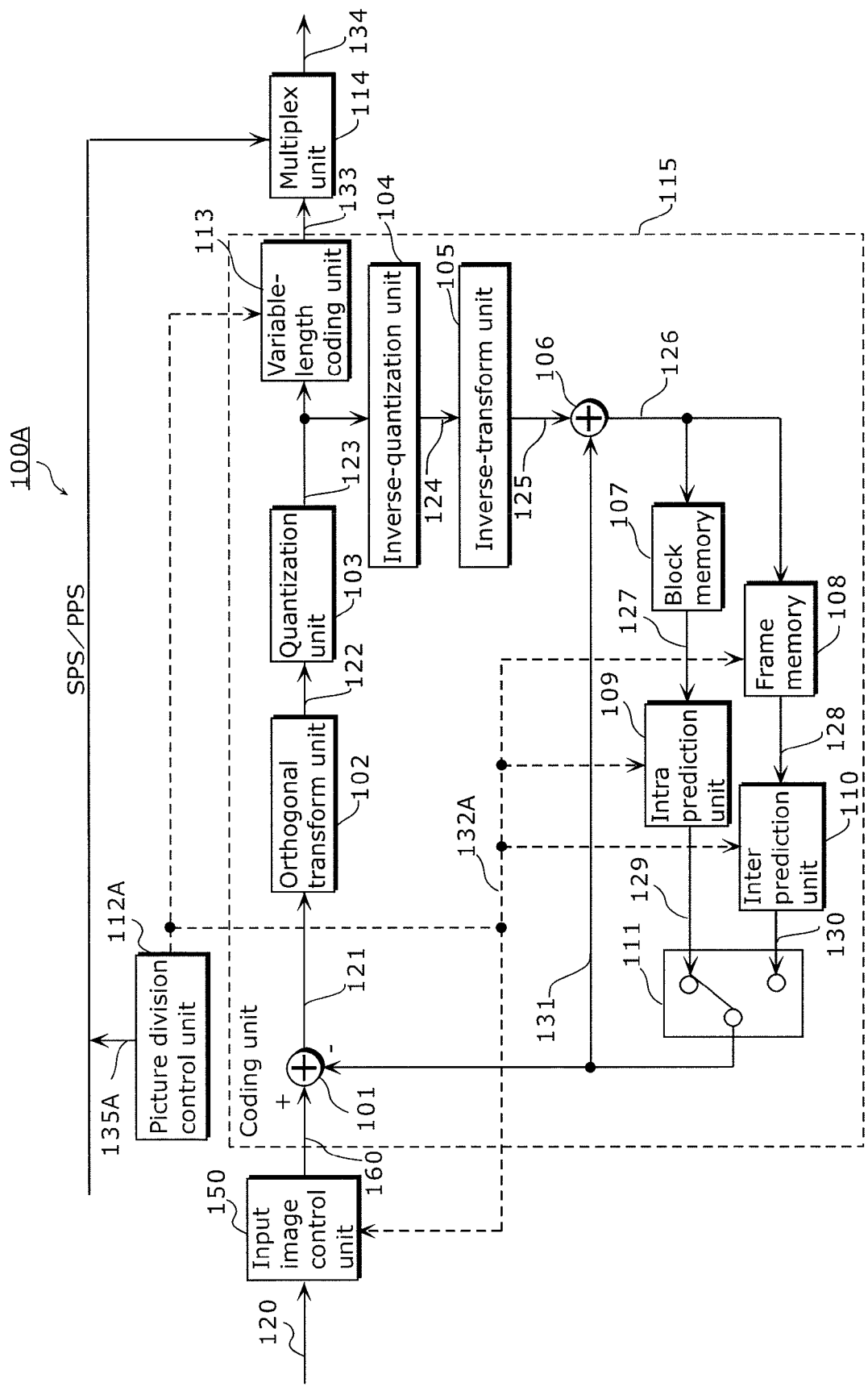
FIG. 6 is a block diagram of an image coding apparatus according to Embodiment 2 of the present disclosure.

FIG. 6 is a block diagram showing the configuration of an image coding apparatus which uses the image coding method according to this embodiment. The same numerical reference is given to constituent elements that are the same as those in FIG. 1.

An image coding apparatus 100A shown in FIG. 6 includes an input image control unit 150, in addition to the configuration of the image coding apparatus 100 shown in FIG. 1. Furthermore, the function of a picture division control unit 112A is different from that of the picture division control unit 112.

Specifically, in addition to the function of dividing a picture into tiles as described in Embodiment 1, the picture division control unit 112A, which is an example of the division unit, determines the order for coding and decoding the tiles, and generates picture division information 135A including tile processing order information indicating the determined order. Then, the picture division control unit 112A transmits, to the multiplex unit 114, the picture division information 135A including the tile processing order information, as part of a sequence parameter set (SPS) or a picture parameter set (PPS).

Furthermore, the picture division control unit 112A generates, based on the picture division pattern, the tile pair dependence relationships, and the coding order, a division control signal 132A for controlling the intra prediction unit 109, the inter prediction unit 110, the variable-length coding unit 113, the frame memory 108, and the input image control unit 150. It should be noted that the picture division information 135A-based operation of the intra prediction unit 109, the inter prediction unit 110, and the variable-length coding unit 113 is the same as in Embodiment 1.

The input image control unit 150 rearranges the input image signal 120, on a block basis, to a predetermined order, to thereby input a rearranged image signal 160 to the coding unit. When the picture is divided into tiles, the input image control unit 150 determines the order of the blocks according to the coding order indicated by the division control signal 132A transmitted from the picture division control unit 112.

In accordance with the division control signal 132A, the frame memory 108 recognizes the order in which the tiles are to be processed, and stores the decoded image data 128 in an appropriate memory area.

Next, the tile processing order information indicating the order for processing (scanning) the tiles shall be described. By using the tile processing order information, the image coding apparatus and the image decoding apparatus can identify the tile scanning direction and the column or row scanning order, and uniquely identify the coding or decoding order of the tiles in the picture.

FIG. 7A to FIG. 7D are diagrams each showing, for a picture that has been divided into nine tiles, an order in which the tiles are to be processed (scanned). It should be noted that the tiles are to be processed in an order from T1 to T9.

FIG. 7A shows the case for a raster scan. Specifically, the top row is selected and, in the selected row, the tiles are sequentially selected in a horizontal direction (rightward direction) from the tile on the left. When all the tiles in one row are selected, the next row below is selected and, in the selected row, the tiles are likewise sequentially selected in a rightward direction from the tile on the left.

In FIG. 7B, the left column is selected and, in the selected column, the tiles are sequentially selected in the vertical direction (downward direction) from the tile at the top. When all the tiles in one column are selected, the next column to the left is selected and, in the selected column, the tiles are likewise sequentially selected in the downward direction from the tile on the top. In other words, the tiles are scanned in the vertical direction.

In this manner, the scanning directions are broadly classified into the horizontal direction and the vertical direction. Next, the row scanning order shall be described. In FIG. 7A, the tiles are scanned in the horizontal direction, and the rows are scanned from top to bottom (in the order of the first row, second row, and third row). In contrast, in FIG. 7C, the scanning of the tiles in the horizontal direction is the same as in FIG. 7A but the rows are scanned in the order of center, top, down (second column, first column, third column). Moreover, although not shown in the figure, the rows may be scanned in the order of center, bottom, top (third, second, first), or from the bottom to the top (third, second, first).

Furthermore, the scanning order of the rows is assigned a predetermined ID before hand, and the image coding apparatus and the image decoding apparatus share such information. For example, "1" is assigned as a row scanning ID to the scanning order in FIG. 7A, and "2" is assigned as the row scanning ID to the scanning order in FIG. 7C. Then, the row scanning ID is sent from the image coding apparatus to the image decoding apparatus. With this, the image decoding apparatus is able to identify the row scanning order by using the row scanning ID.

The details for the column scanning order are the same as in the row scanning order. In FIG. 7B, the tiles are scanned in the vertical direction, and the columns are scanned from left to right (in the order of the first column, second column, and third column). In contrast, in FIG. 7D, the scanning of the tiles in the vertical direction is the same but the columns are scanned in the order of center, left, right (second column, first column, third column). Moreover, although not shown in the figure, the columns may be scanned in the order of center, right, left (second, third, first), or from right to left (third, second, first).

Furthermore, the scanning order of the columns is also assigned a predetermined ID before hand, and the image coding apparatus and the image decoding apparatus share such information.

The tile processing order information includes the tile scanning direction (the horizontal direction or the vertical direction) and the column or row scanning ID. By using the tile processing order information, the image decoding apparatus is able to uniquely identify the decoding order of the tiles in the picture. It should be noted that although an example in which a picture is divided into 9 tiles is shown in FIG. 7A to FIG. 7D, other methods of tile division (number of columns and number of rows) are acceptable.

In this manner, the image coding apparatus 100A in this embodiment is capable of changing the processing order of tiles in a picture. By controlling the processing order of tiles in this manner, it is possible to transmit only the leading tile group depending on the state of communications and the application. For example, for a telephone conference, and the like, a tile group in a central column in which a person appears can be coded first.

As described above, in the image coding apparatus 100A according to this embodiment, the picture division control unit 112A determines the coding order of plural tiles. The coding unit 115 codes the tiles in the coding order determined by the picture division control unit 112A. The multiplex unit 114 generates the bitstream 134 including the tile processing order information indicating the determined coding order.

With this, the tile decoding order in the image decoding apparatus can be arbitrarily set. Therefore, for example, among the images of regions included in a picture, the image of a region having a high priority can be decoded ahead in the image decoding apparatus.

Hereinafter, the image decoding apparatus according to this embodiment shall be described.

Figure 8:
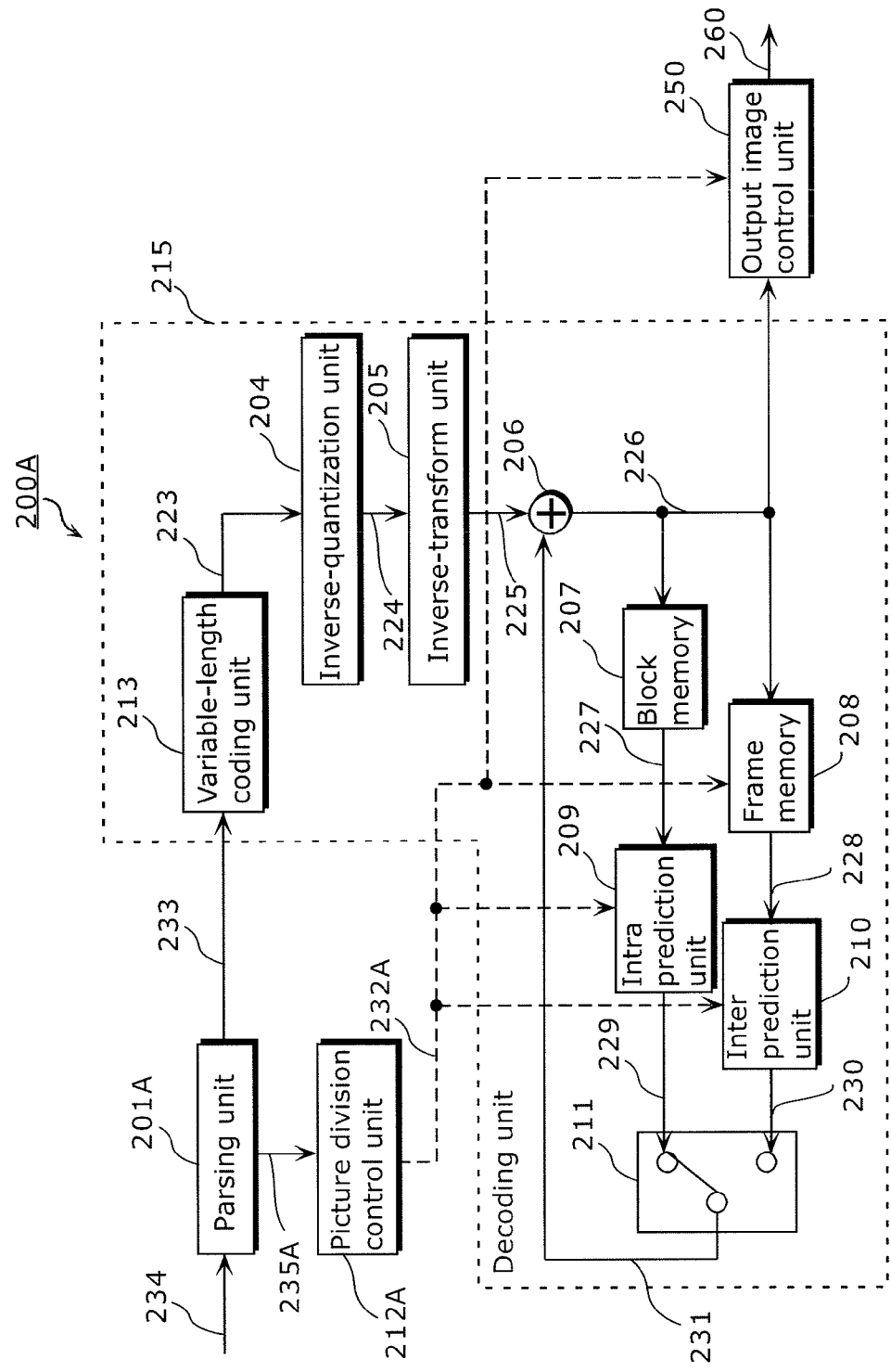
FIG. 8 is a block diagram of an image decoding apparatus according to Embodiment 2 of the present disclosure.

FIG. 8 is a block diagram showing the configuration of an image decoding apparatus which uses the image decoding method according to this embodiment. It should be noted that the same numerical reference is given to constituent elements that are the same as those in FIG. 5.

Here, the bitstream 234 corresponds to the bitstream 134 generated by the above-described image coding apparatus 100A.

An image decoding apparatus 200A shown in FIG. 8 includes an output image control unit 250, in addition to the configuration of the image decoding apparatus 200 shown in FIG. 5. Furthermore, the functions of a parsing unit 201A and a picture division control unit 212A are different from those of the parsing unit 201 and the picture division control unit 212.

Specifically, the parsing unit 201A parses the bitstream 234 to obtain the coded data 233 and picture division information 235A. The picture division information 235A corresponds to the above-described picture division information 135A, and includes tile processing order information indicating the order in which tiles are to be decoded.

The picture division control unit 212A generates, based on the picture division pattern, the tile pair dependence relationships, and the decoding order which are indicated by the picture division information 235A, a division control signal 232A for controlling the intra prediction unit 209, the inter prediction unit 210, the variable-length decoding unit 213, the frame memory 208, and the output image control unit 250. It should be noted that the picture division information 135A-based operation of the intra prediction unit 209, the inter prediction unit 210, and the variable-length decoding unit 213 is the same as in Embodiment 1.

The output image control unit 250 rearranges the decoded image data 226 to a predetermined order on a block basis, and outputs a rearranged image signal 260 to the outside of the apparatus. When the picture is divided into tiles, the output image control unit 250 determines the order of the blocks according to the decoding order indicated by the division control signal 232A transmitted from the picture division control unit 212A.

In accordance with the division control signal 232A, the frame memory 208 recognizes the order in which the tiles are to be processed, and stores the decoded image data 228 in an appropriate memory area.

According to the above-described configuration, the image decoding apparatus 200A according to this embodiment is capable of decoding the bitstream generated by the above-described image coding apparatus 100A.

Embodiment 3

In this embodiment, a modification of the previously-described image coding apparatus 100 according to Embodiment 1 shall be described. It is to be noted that, hereinafter, description shall be carried out primarily on the points of difference with Embodiment 1 and overlapping description shall be omitted.

As described in Embodiment 1, in the decoding of high definition images called Super Hi-Vision and UHDTV which exceed the level of definition in Hi-Vision, the computation load is high and real-time processing is difficult. As such, when decoding high definition images, the image decoding apparatus needs to perform parallel processing on the bit stream. Since the tile pair dependence relationships are cut, the image decoding apparatus can decode a tile independently of other tiles.

However, in decoding, parallel processing cannot be implemented unless the image decoding apparatus can detect the lead position (entry point) of each tile in the bitstream. A method for solving this problem is already known (see, Non Patent Literature 2). According to this method, the image coding apparatus inserts a tile marker at the lead position of each tile in the bitstream. The image decoding apparatus is able to recognize the lead position (entry point) of each tile in the bitstream by scanning the bitstream and detecting the tile markers.

However, inserting a tile marker at the lead position (tile boundary) of all the tiles in the bitstream would lead to the deterioration of coding efficiency. The bitstream output by the variable-length coding unit is not byte-aligned at the tile boundaries. Therefore, in order to insert a tile marker at the lead position of each tile, it is necessary to reset the entropy coding (for example, CABAC) by the variable-length coding unit. In addition, resetting the entropy coding leads to the deterioration of coding efficiency.

In contrast, the image coding apparatus according to this embodiment determines, for each tile boundary in the bitstream, whether or not to insert a tile marker, and inserts a tile marker only in part of the tile markers. Accordingly, the image coding apparatus is able to reduce the number of times the entropy coding is reset, and thus coding efficiency can be improved.

Figure 9:
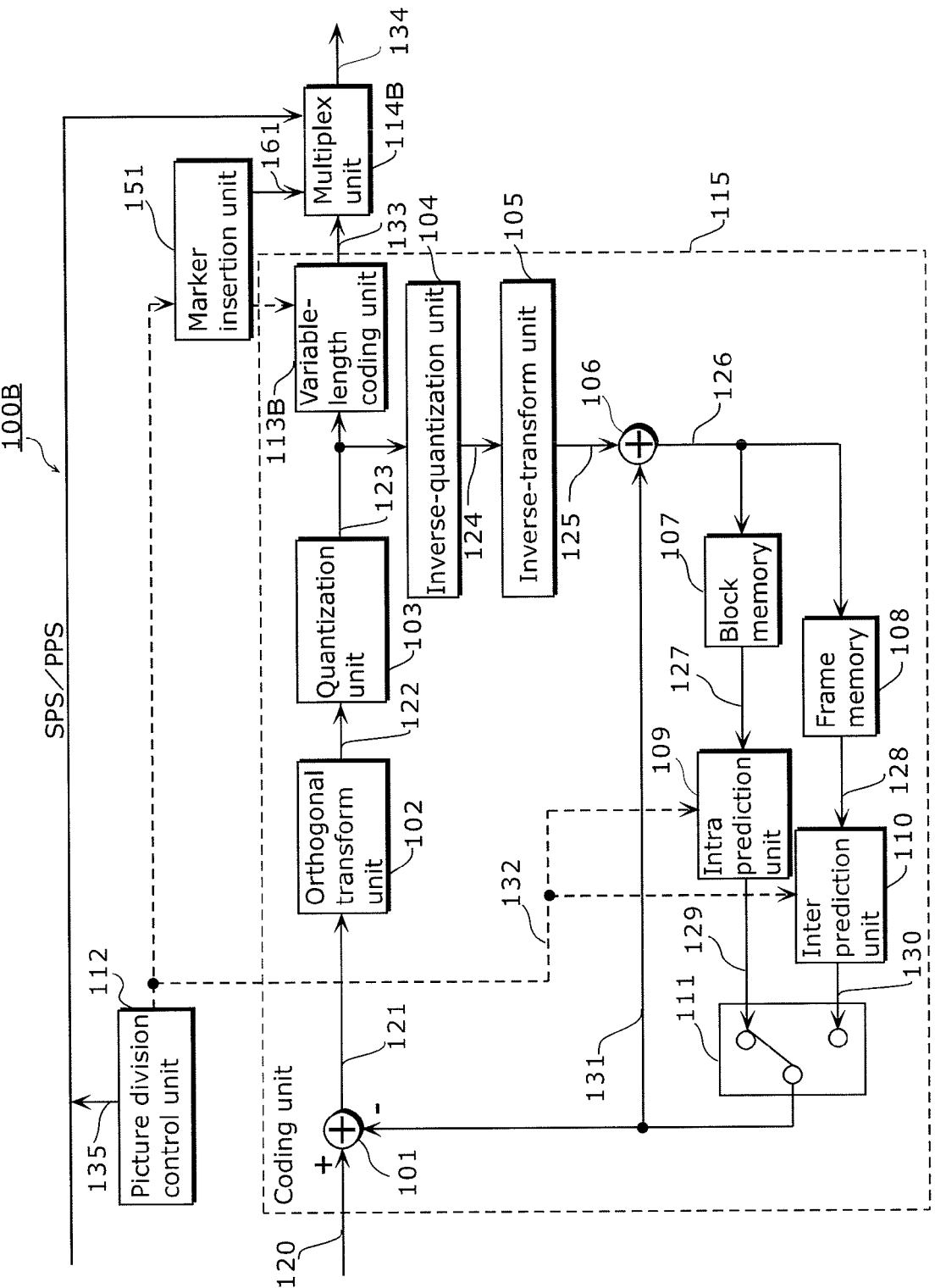
FIG. 9 is a block diagram of an image coding apparatus according to Embodiment 3 of the present disclosure.

FIG. 9 is a block diagram showing the configuration of an image coding apparatus 100B which uses the image coding method according to this embodiment. It should be noted that the same numerical reference is given to constituent elements that are the same as those in FIG. 1.

The image coding apparatus 100B shown in FIG. 9 includes a marker insertion unit 151, in addition to the configuration of the image coding apparatus 100 shown in FIG. 1. Furthermore, the functions of a variable-length coding unit 113B and a multiplex unit 114B are different from those of the variable-length coding unit 113 and the multiplex unit 114, respectively.

Based on the division control signal 132 transmitted from the picture division control unit 112, the marker insertion unit 151 inserts, at each tile boundary between pieces of coded data 133, a tile marker 161 for identifying the tile boundary. Specifically, the marker insertion unit 151 controls the variable-length coding unit 113B to reset the entropy coding (CABAC) at an independent boundary, by notifying the variable-length coding unit 113B of such independent tile boundary. Furthermore, the marker insertion unit 151 transmits a tile marker 161 to the multiplex unit 114B, at an independent tile boundary.

The variable-length coding unit 113B resets the entropy coding (CABAC) at the specified tile boundary, in accordance with the notification from the marker insertion unit 151.

The multiplex unit 114B generates the bitstream 134 by inserting the tile marker 161 transmitted by the marker insertion unit 151, at the specified tile boundary of the pieces of coded data 133.

Figure 10:
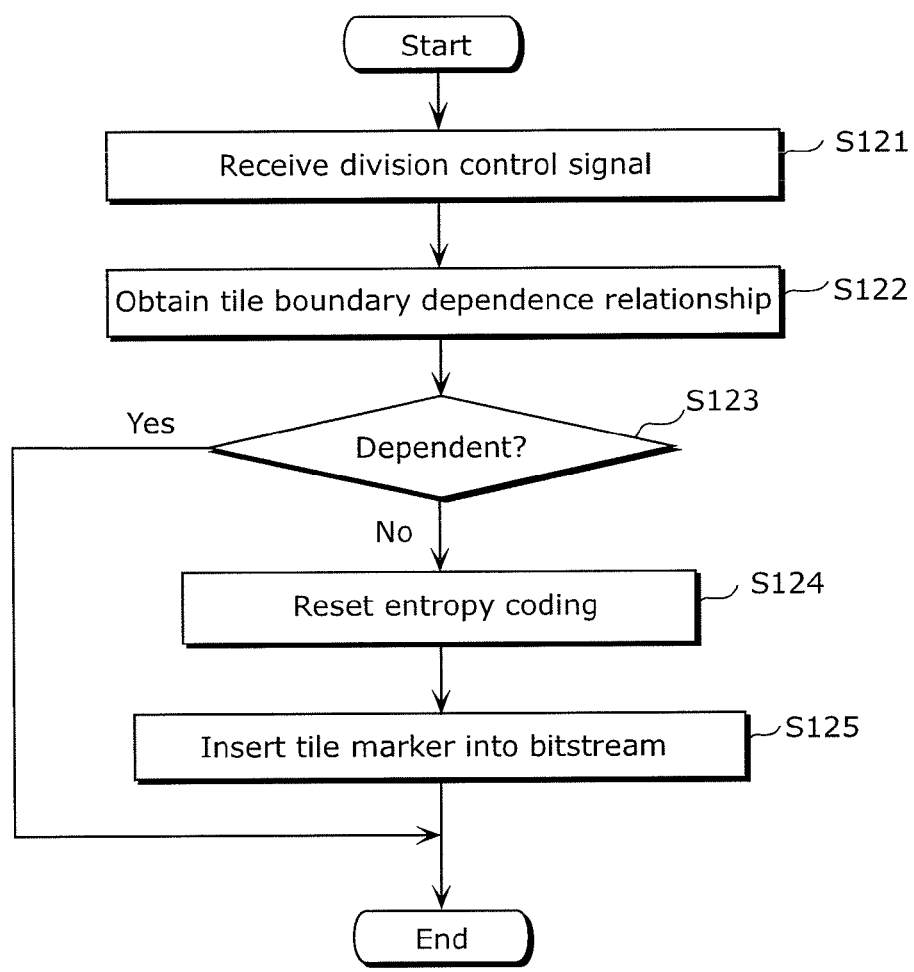
FIG. 10 is a flowchart of a marker insertion process according to Embodiment 3 of the present disclosure.

FIG. 10 is a flowchart of the marker insertion process performed by the marker insertion unit 151 according to this embodiment.

First, the marker insertion unit 151 receives the division control signal 132 from the picture division control unit 112 (S121). This division control signal 132 represents information regarding the tile division. It should be noted that the marker insertion unit 151 may receive the picture division information 135 in place of the division control signal 132. It should be noted that the information regarding the division of all tiles in the picture need not be received all at once, and the information regarding a tile may be received at the timing at which such tile is to be processed by the image coding apparatus 100B.

Next, the tile insertion unit 151 obtains the dependence relationship at the boundary between the tile currently being processed and the tile to be processed from hereon which is included in the division control signal 132 (S122), and determines the dependence relationship between the tile currently being processed and the tile to be processed from hereon (S123).

When the tiles are dependent (Yes in S123), the marker insertion unit 151 ends the process. On the other hand, when the tiles are not dependent, that is, the tiles are independent (No in S123), the marker insertion unit 151 controls the variable-length coding unit 113B to reset the entropy coding (CABAC) (S124). With this, the variable-length coding unit 113B resets the entropy coding (CABAC) at the end of the tile currently being processed, and performs byte alignment. Then, the variable-length coding unit 113B sends the coded data 133 of the tile currently being processed to the multiplex unit 114B.

Next, the marker insertion unit 151 transmits a tile marker 161 to the multiplex unit 114B. The multiplex unit 114B inserts the tile marker 161 immediately after the bitstream of the tile currently being processed, that is, at the beginning of the bitstream of the tile to be processed from hereon (S125).

As described above, the marker insertion unit 151 switches between inserting and not inserting tile markers. 161 at the respective tile boundaries in the bitstream, depending on the dependence relationship at the tile boundary.

It should be noted that, in step S121, when the received division control signal 132 indicates that all the tile boundaries in the picture are dependent, the marker insertion unit 151 may omit the process from steps S122 to S125 for such picture.

In this manner, the image coding apparatus 100B according to this embodiment is capable of reducing the number of times that entropy coding (CABAC) is reset, by controlling the insertion of tile markers at the respective tile boundaries of a bitstream. Accordingly, the image coding apparatus 100B is capable of improving coding efficiency.

As described above, in the image coding apparatus 100B according to this embodiment, among data boundaries of pieces of coded data 133, the marker insertion unit 151 inserts, only at a data boundary for which the boundary between two tiles corresponding to two pieces of coded data on opposite sides of the data boundary is a second boundary (independent), a marker for identifying such data boundary. Accordingly, the image coding apparatus 1008 is capable of improving coding efficiency compared to when markers are inserted at all the tile boundaries.

Hereinafter, the image decoding apparatus according to this embodiment shall be described.

Figure 11:
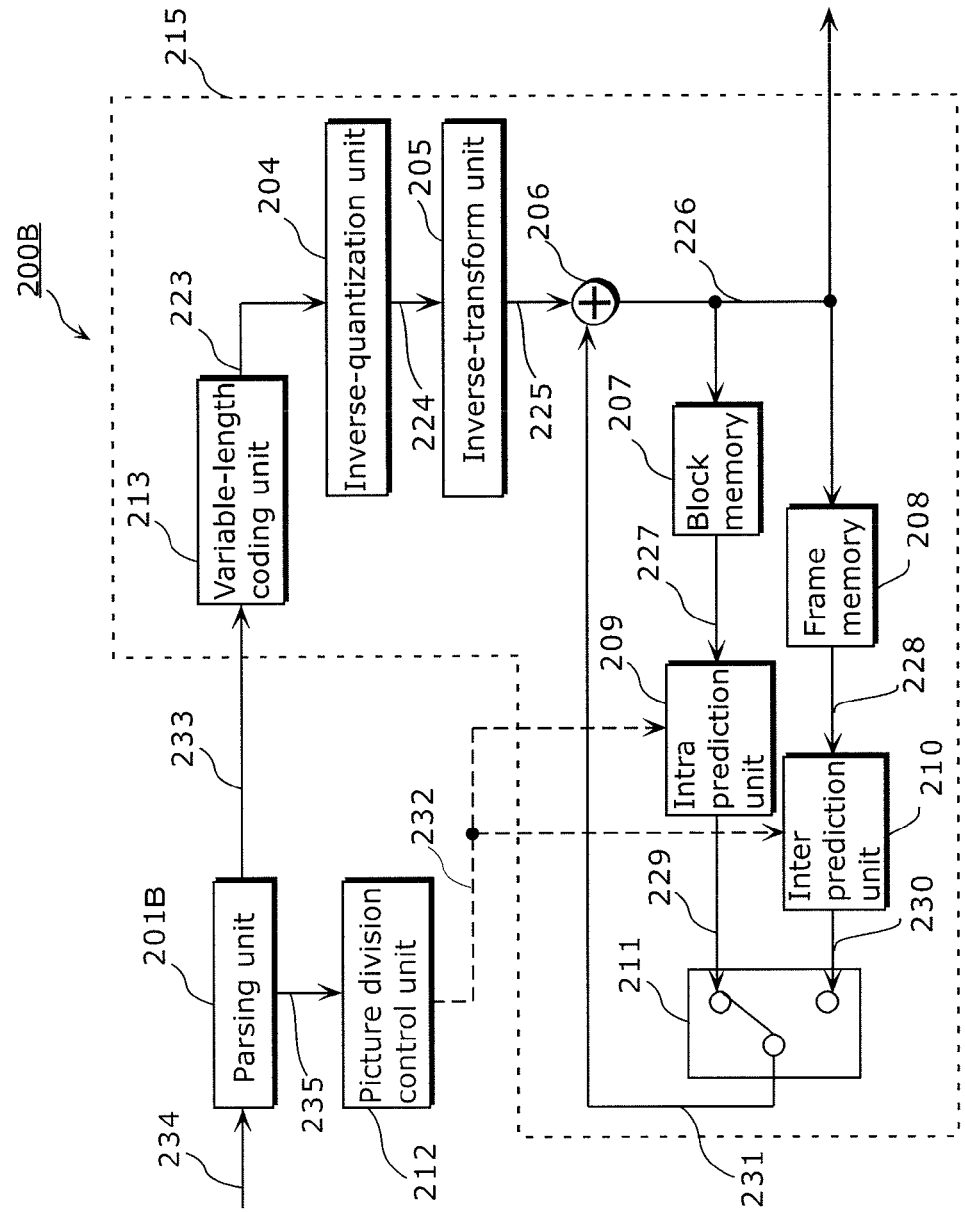
FIG. 11 is a block diagram of an image decoding apparatus according to Embodiment 3 of the present disclosure.

FIG. 11 is a block diagram showing the configuration of an image decoding apparatus which uses the image decoding method according to this embodiment. It should be noted that the same numerical reference is given to constituent elements that are the same as those in FIG. 5.

Here, the bitstream 234 corresponds to the bitstream 134 generated by the above-described image coding apparatus 100B.

In an image decoding apparatus 200A shown in FIG. 11, the function of a parsing unit 201B is different to that of the parsing unit 201.

Specifically, the parsing unit 201B parses the bitstream 234 to obtain the coded data 233 and the picture division information 235. Furthermore, the parsing unit 201B detects the tile marker 161 inserted at a tile boundary, and recognizes the detected position as the tile boundary. Furthermore, the parsing unit 201B notifies the detected tile boundary to the variable-length decoding unit 213.

Furthermore, when the decoding unit 215 performs parallel processing, the parsing unit 201B extracts, from the bitstream 234, the coded data 233 corresponding to each tile depending on the tile boundary, and sends the coded data 233 to the decoding unit 215.

According to the above-described configuration, the image decoding apparatus 200B according to this embodiment is capable of decoding the bitstream generated by the above-described image coding apparatus 100B.

Embodiment 4

In this embodiment, an image coding apparatus and an image decoding apparatus which perform byte alignment at a tile boundary shall be described.

Figure 12:
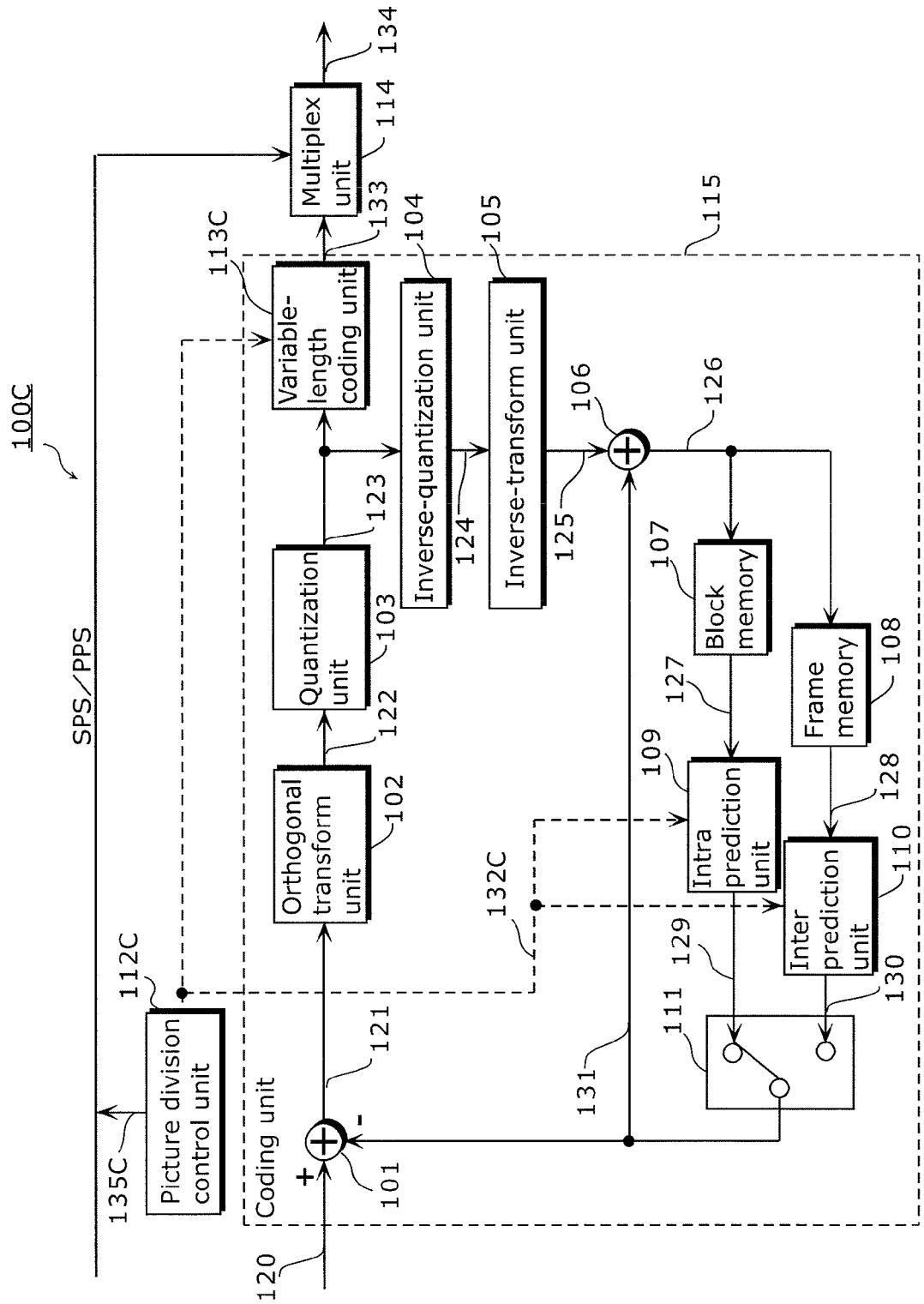
FIG. 12 is a block diagram of an image coding apparatus according to Embodiment 4 of the present disclosure.

FIG. 12 is a block diagram showing the configuration of an image coding apparatus 100C according to this embodiment. The same numerical reference is given to constituent elements that are the same as those in FIG. 1.

The image coding apparatus 100C shown in FIG. 12 is different compared to the configuration of the image coding apparatus 100 shown in FIG. 1 in that the functions of a picture division control unit 112C and a variable-length coding unit 113C are different from those of the picture division control unit 112 and the variable-length coding unit 113.

The picture division control unit 112C, which is an example of the division unit, divides a picture into tiles. Furthermore, although the picture division control unit 112 switches the dependence relationship on a tile boundary basis in Embodiment 1, the picture division control unit 112C handles all the tiles as being independent. Furthermore, the picture division control unit 112C generates picture division information 135C indicating the picture division pattern. Here, the information indicating the picture division pattern includes, for example, the number of columns, the number of rows, the column width uniform flag, and the row height uniform flag, the column width, and the row height, which have been previously described.

It should be noted that although an example in which the picture division control unit 112C handles all the tiles as being independent shall be described hereafter, the picture division control unit 112C may also switch the tile dependence relationship on a tile boundary basis in the same manner as in Embodiment 1.

Then, the picture division control unit 112C transmits, to the multiplex unit 114, the generated picture division information 135C as part of a sequence parameter set or a picture parameter set.

Furthermore, the picture division control unit 112C generates, based on the picture division pattern, a division control signal 132C for controlling the intra prediction unit 109, the inter prediction unit 110, and the variable-length coding unit 113C. It should be noted that the picture division information 135C-based operation of the intra prediction unit 109 and the inter prediction unit 110 is the same as the operation when tiles are independent in Embodiment 1.

The variable-length coding 113C performs processing to reset the entropy coding at the tile boundaries and performs byte alignment.

Hereinafter, the flow of the operation of the image coding apparatus 100C according to this embodiment shall be described.

Figure 13A:
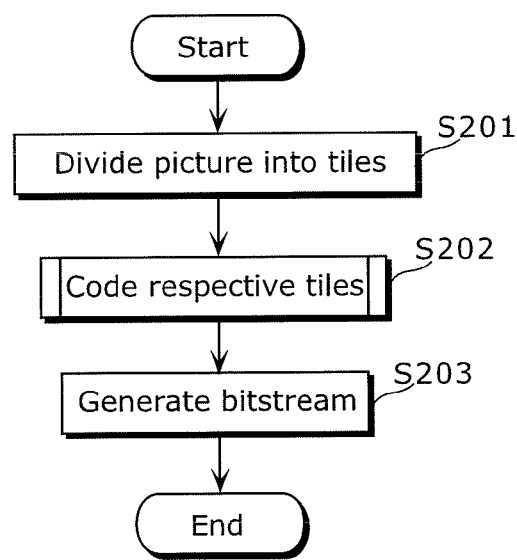
FIG. 13A is a flowchart for an image coding method according to Embodiment 4 of the present disclosure.

FIG. 13A is a flowchart of the image coding method performed by the image coding apparatus 100C according to this embodiment.

First, the picture division control unit 112C divides a picture into tiles (S201). Furthermore, the picture division control unit 112C generates picture division information 135C indicating the picture division pattern.

Next, the coding unit 115 codes the respective tiles to generate pieces of coded data 133 each corresponding to a different one of the tiles (S202).

Next, the multiplex unit 114 generates the bitstream 134 including the pieces of coded data 133 and the picture division information 135C (S203).

Figure 13B:
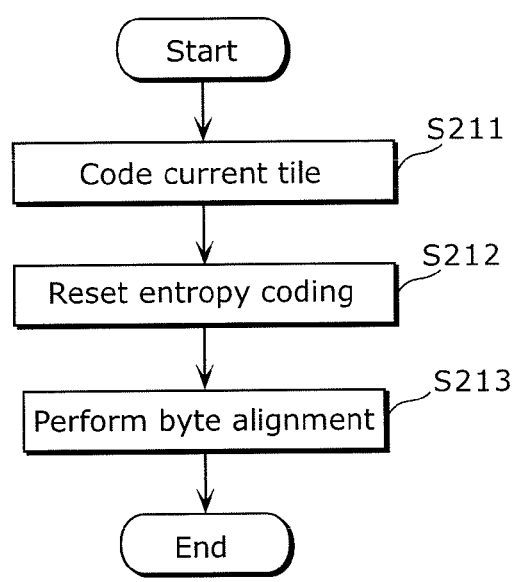
FIG. 13B is a flowchart for coding according to Embodiment 4 of the present disclosure.

FIG. 13B is a flowchart of the coding (S202) performed by the coding unit 115.

First, the coding unit 115 codes a current tile to be processed which is one of the tiles, to generate a code string (S211). It should be noted that the specific method for the coding by the coding unit 115 is, for example, the same as that in Embodiment 1. Furthermore, the coding unit 115 codes the current tile without referring to the coding information used in the coding of another tile.

Here, the coding includes the process of generating a code string through entropy coding (arithmetic coding) performed by the variable-length coding unit 113C.

Furthermore, the variable-length coding unit 113C resets the entropy coding (arithmetic coding) after the coding of the current tile is finished (S212). Here, resetting includes termination (also called flushing) in arithmetic coding. Termination is the process of making the code string of the current tile independent from the code string of another tile. Stated differently, termination is the process of concluding the code string of the current tile. Specifically, by way of termination, all the code strings being processed are output in an independently-decodable state.

Next, the variable-length coding 113C performs byte alignment on the current code string to be processed (S213). Here, byte alignment is a process of adding a predetermined bit string after the current code string to generate a byte-unit of the coded data 133. Stated differently, byte alignment is a process of adjusting the number of bits of the current code string to generate the coded data 133 in byte-units.

Figure 14:
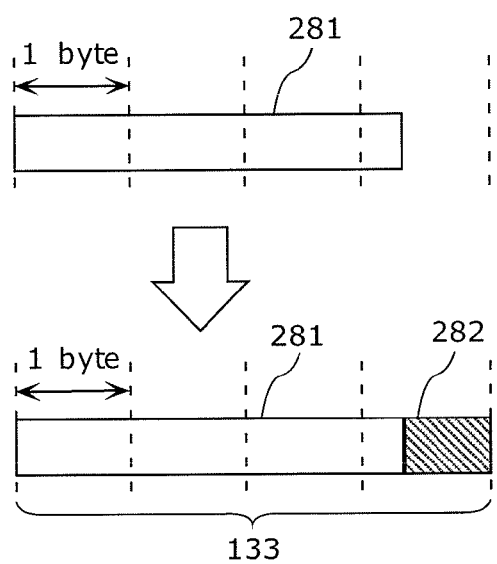
FIG. 14 is a diagram showing byte alignment according to Embodiment 4 of the present disclosure.

FIG. 14 is a diagram showing an example of byte alignment. As shown in FIG. 14, the variable-length coding unit 113C adds a bit string 282 behind a current code string to be processed 281 to generate the coded data 133 in byte-units. For example, the bit string 282 is a bit string which begins with "1" and subsequently continues with "0".

It should be noted that although an example in which the variable-length coding unit 113C performs byte alignment to generate the coded data 133 in byte units is described here, it is sufficient that the alignment be a process for adjusting the coded data 133 to a multiple of a predetermined N bits (N being an integer greater than or equal to 2). For example, the variable-length coding 113C may perform alignment to generate the coded data 133 in word units.

Furthermore, although an example is described here in which alignment is performed when arithmetic coding (for example, CABAC) is performed as the entropy coding, the same alignment may be performed even when entropy coding other than arithmetic coding is performed.

Furthermore, the picture division control unit 112C may generate the picture division information 135C including information indicating the lead position of the coded data 133. In addition, the information indicating the lead position may be information indicating the position in byte-units (or in a unit that is the same as that used in the alignment).

With this, the image coding apparatus 100C according to this embodiment performs byte alignment at the tile boundaries. Accordingly, the coded data 133 of each tile becomes a byte-unit.

Therefore, it becomes easy to handle coded data in the image decoding apparatus. Furthermore, the image decoding apparatus can easily identify the lead position of the coded data of a tile. In this manner, the image coding apparatus 100C is capable of reducing the processing load of the image decoding apparatus.

Furthermore, the image coding apparatus 100C resets the entropy coding at the tile boundaries. Accordingly, the image decoding apparatus can handle the coded data 133 of each tile independently.

Hereinafter, the image decoding apparatus according to this embodiment shall be described.

Figure 15:
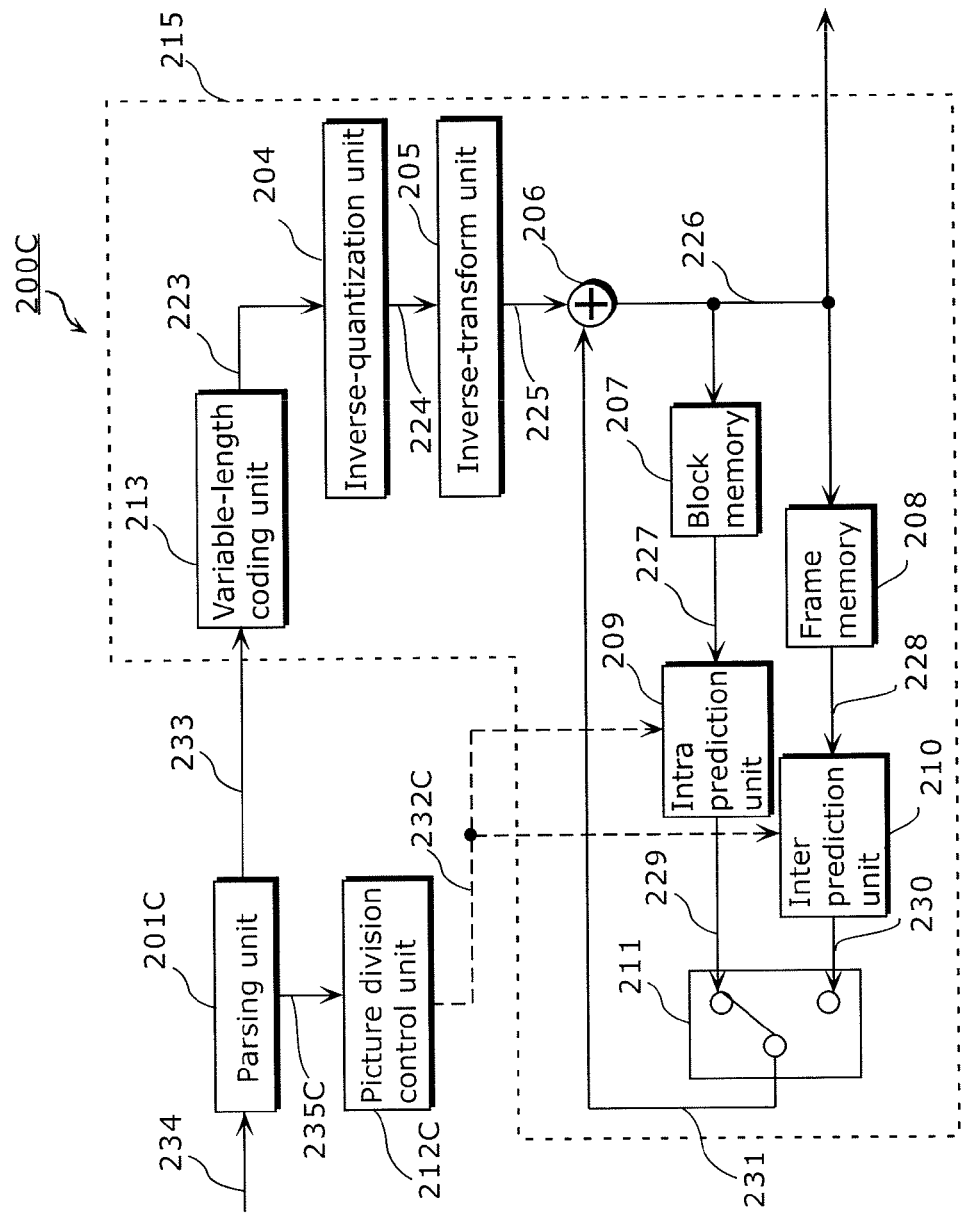
FIG. 15 is a block diagram of an image decoding apparatus according to Embodiment 4 of the present disclosure.

FIG. 15 is a block diagram showing the configuration of an image decoding apparatus which uses the image decoding method according to this embodiment. It should be noted that the same numerical reference is given to constituent elements that are the same as those in FIG. 5.

Here, the bitstream 234 corresponds to the bitstream 134 generated by the above-described image coding apparatus 100C.

The image decoding apparatus 200C shown in FIG. 15 is different compared to the image decoding apparatus 200 shown in FIG. in that the functions of a parsing unit 201C, a picture division control unit 212C, and a variable-length decoding unit 213C are different from those of the parsing unit 201, the picture division control unit 212, and the variable-length decoding unit 213.

Specifically, the parsing unit 201C parses the bitstream 234 to obtain the coded data 233 and picture division information 235C. The picture division information 235C corresponds to the above-described picture division information 135C, and indicates the picture division pattern.

Based on the picture division pattern indicated by the picture division information 235C, the picture division control unit 212C generates a division control signal 232C for controlling the intra prediction unit 209, the inter prediction unit 210, and the variable-length decoding unit 213C. It should be noted that the picture division information 135C-based operation of the intra prediction unit 209 and the inter prediction unit 210 is the same as the operation when tiles are independent in Embodiment 1.

The variable-length decoding unit 213C skips the predetermined bit string located after the code string in the coded data 233. Specifically, the variable-length decoding unit 213C skips the predetermined bit string inserted at the tile boundary in the alignment.

Figure 16A:
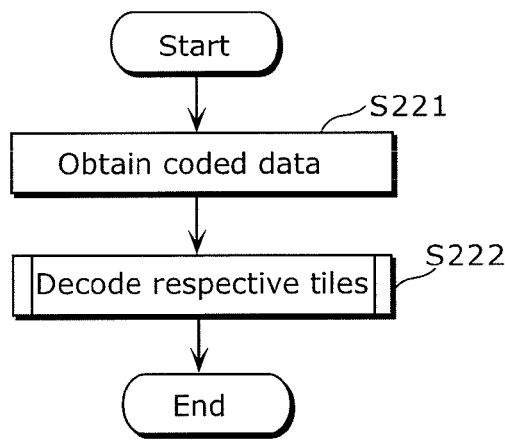
FIG. 16A is a flowchart for an image decoding method according to Embodiment 4 of the present disclosure.

Hereinafter, the flow of the operation of the image decoding apparatus 200C according to this embodiment shall be described. FIG. 16A is a flowchart of the image decoding method performed by the image decoding apparatus 200C according to this embodiment.

First, the parsing unit 201C obtains the picture division information 235C and the pieces of coded data 233 generated by coding the respective tiles, which are included in the bitstream 234 (S221).

Next, the decoding unit 215 decodes each of the pieces of coded data 233 to generate the decoded image data 226 which is the image data of the tiles (S222).

Figure 16B:
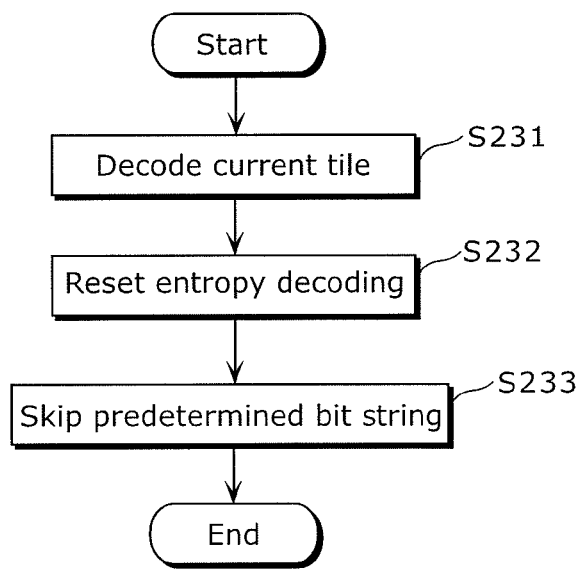
FIG. 16B is a flowchart for decoding according to Embodiment 4 of the present disclosure.

FIG. 16B is a flowchart of the decoding (S222) performed by the decoding unit 215. Furthermore, FIG. 16B shows the decoding of a single piece of coded data 233 to be processed.

First, the decoding unit 215 decodes the code string included in the current coded data 233 to be processed which corresponds to one of the tiles, to generate current decoded image data 226 to be processed (S231). It should be noted that the specific method for the decoding by the decoding unit 215 is, for example, the same as that in Embodiment 1.

Furthermore, the decoding unit 215 decodes the current tile to be processed, without referring to the decoding information used in the decoding of another tile.

Here, the decoding includes the process of generating a code string (quantized coefficients 223) through entropy decoding (arithmetic decoding) by the variable-length decoding unit 213C.

Furthermore, the variable-length decoding unit 213C resets the entropy decoding (arithmetic decoding) after the decoding of the current tile is finished (S232). Here, resetting includes the termination (also called flushing) in arithmetic decoding. Termination is processing for concluding the arithmetic coding on the current code string to be processed.

Next, the variable-length decoding unit 213C skips the predetermined bit string located after the code string in the current coded data 233 (S233). This bit string corresponds to the bitstream 282 that was inserted in the byte alignment by the image coding apparatus 100C The above-described processing is performed for each of the pieces of coded data 233 which correspond to the respective tiles. Specifically, the variable-length decoding unit 213C decodes a first code string included in first coded data which is one of the pieces of coded data 233 to generate image data of a first tile, and skips a predetermined bit string located after the first code string in the first coded data and codes a second code string included in second coded data located after the first coded data to generate image data of a second tile.

With this processing, the variable-length decoding unit 213C can disregarding the bit string inserted at the tile boundary in the byte alignment by the image coding apparatus 100C, and decode only necessary data. Stated differently, the variable-length decoding unit 213C is capable of skipping such bit string and perform decoding from the beginning of the next piece of coded data 233.

According to the above-described configuration, the image decoding apparatus 200C according to this embodiment is capable of decoding the bitstream generated by the above-described image coding apparatus 100C.

It should be noted that although the above description describes an example in which the image decoding apparatus 200C decodes the pieces of coded data 233 which correspond to the respective tiles chronologically, the image decoding apparatus 200C may decode the pieces of coded data 233 in parallel. In this case, the image decoding apparatus 200C identifies the lead position of each piece of data 233 by referring to information indicating the lead position of the pieces of coded data 233 which is included in the picture division information 235C. Furthermore, the information indicating the lead position may be information indicating the position in byte units.

Although image coding apparatuses and image decoding apparatuses according to the embodiments in the present disclosure have been described thus far, the present disclosure is not limited to such embodiments.

Furthermore, the respective processing units included in the image coding apparatuses and image decoding apparatuses according to the above-described embodiments are typically implemented as an LSI which is an integrated circuit. These processing units may be individually configured as single chips or may be configured so that a part or all of the processing units are included in a single chip. Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In the respective embodiments, the respective constituent elements are configured using dedicated hardware, but may also be implemented by executing software programs suited to the respective constituent elements. The respective constituent elements may be implemented through the reading and execution of a software program recorded on a recording medium such as a hard disk or semiconductor memory by a program execution unit such as a CPU or a processor.

In addition, the present disclosure may be the aforementioned software program, or a non-transitory computer-readable recorder on which the aforementioned program is stored. Furthermore, it should be obvious that the aforementioned program can be distributed via a transmission medium such as the Internet.

Moreover, all numerical figures used in the forgoing description are merely examples for describing the present disclosure in specific terms, and thus the present disclosure is not limited to the illustrated numerical figures.

Furthermore, the separation of the function blocks in the block diagrams is merely an example, and plural function blocks may be implemented as a single function block, a single function block may be separated into plural function blocks, or part of functions of a function block may be transferred to another function block. Furthermore, the functions of function blocks having similar functions may be processed, in parallel or by time-sharing, by a single hardware or software. Furthermore, the sequence in which the above-described steps included in the above-described image coding methods and image decoding methods are executed is given as an example to describe the present description in specific terms, and thus other sequences are possible. Furthermore, part of the above-described steps may be executed simultaneously (in parallel) with another step.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

FIG. 18 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 18, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ext103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 19:
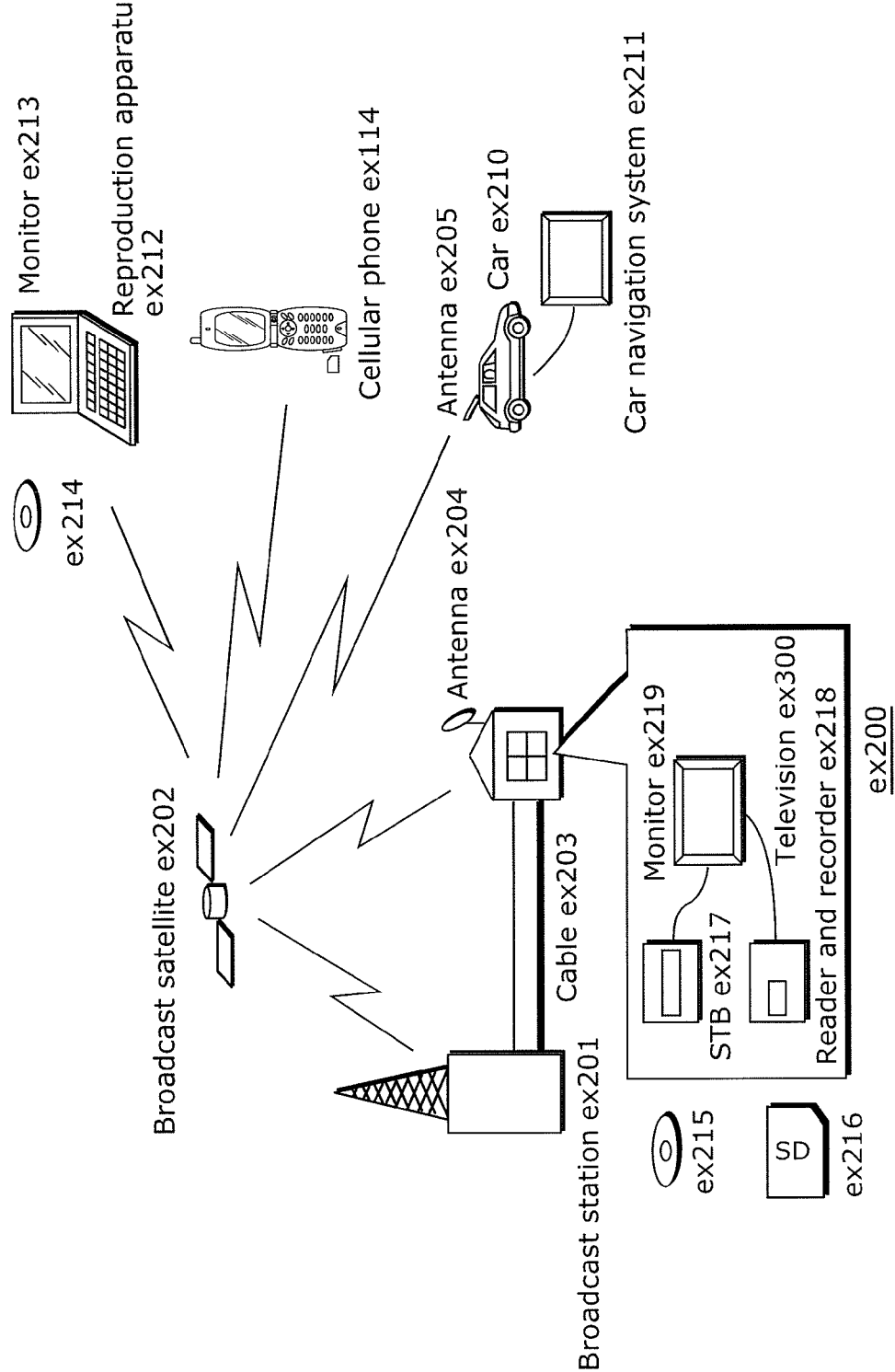
FIG. 19 is a diagram of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 19. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 20:
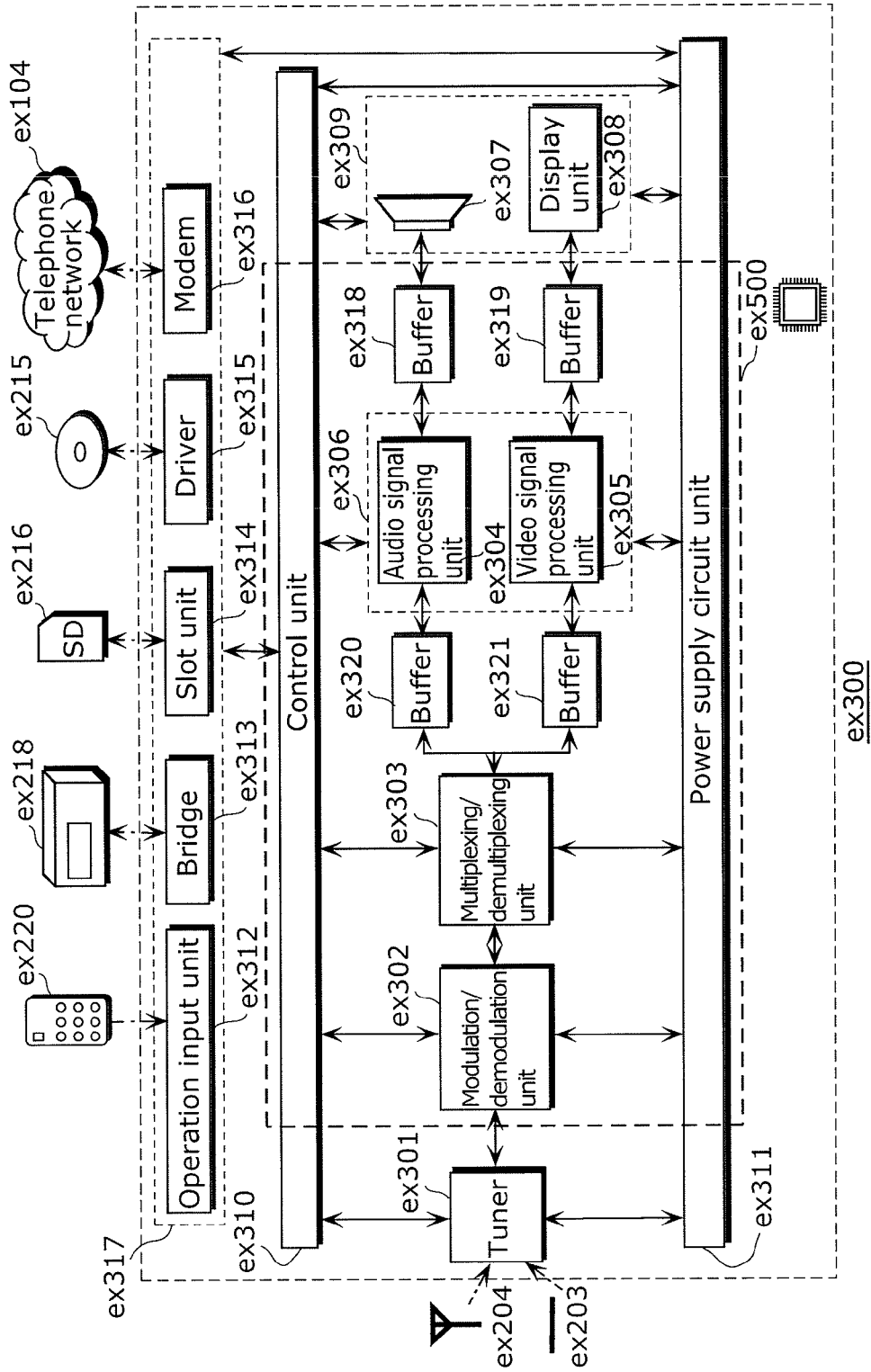
FIG. 20 is a block diagram showing an example of a configuration of a television.

FIG. 20 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex701, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 21:
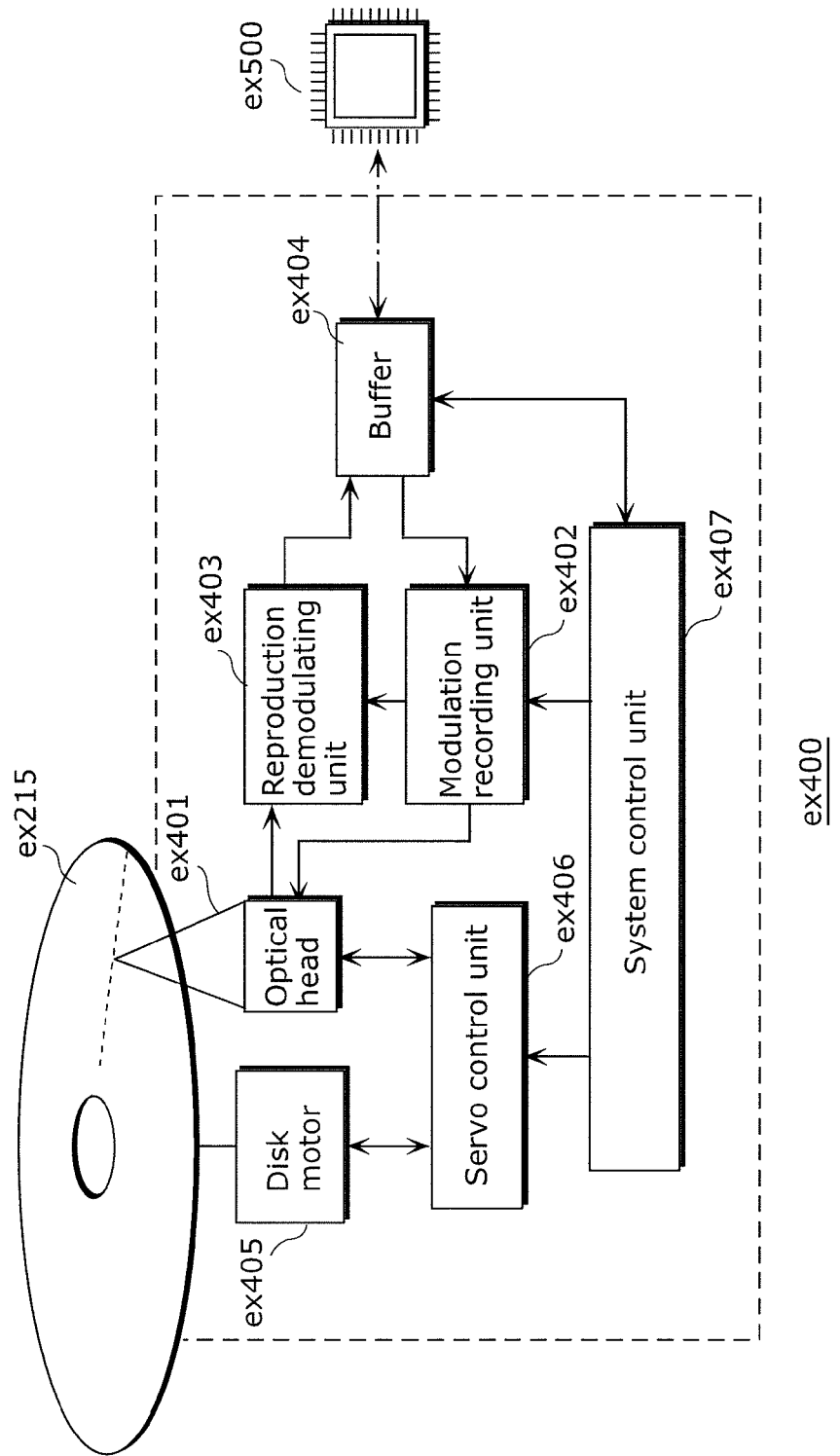
FIG. 21 is a block diagram showing an example of a configuration of an information reproducing/recording unit that reads and writes information from or on a recording medium that is an optical disk.

As an example, FIG. 21 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 22:
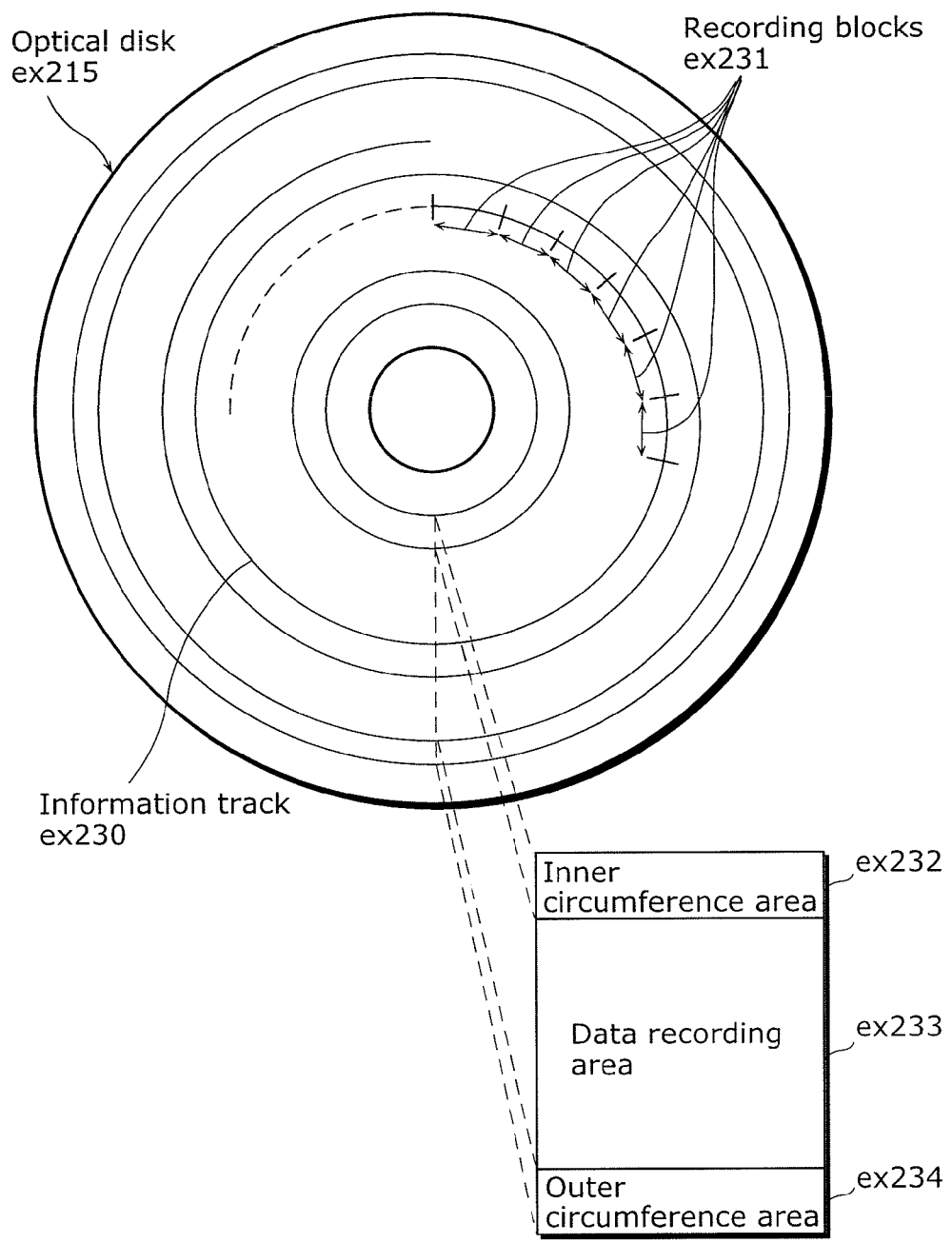
FIG. 22 is a diagram showing an example of a configuration of a recording medium that is an optical disk.

FIG. 22 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 20. The same will be true for the configuration of the computer ex111, the cellular phone ex114, and others.

Figure 23A:
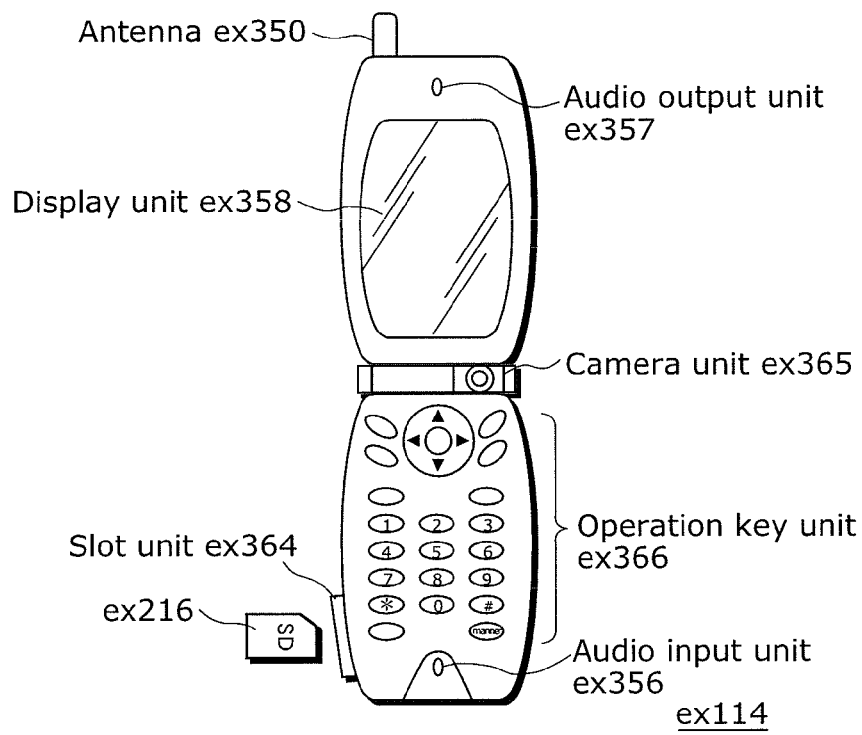
FIG. 23A is a diagram showing an example of a cellular phone.

FIG. 23A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 23B:
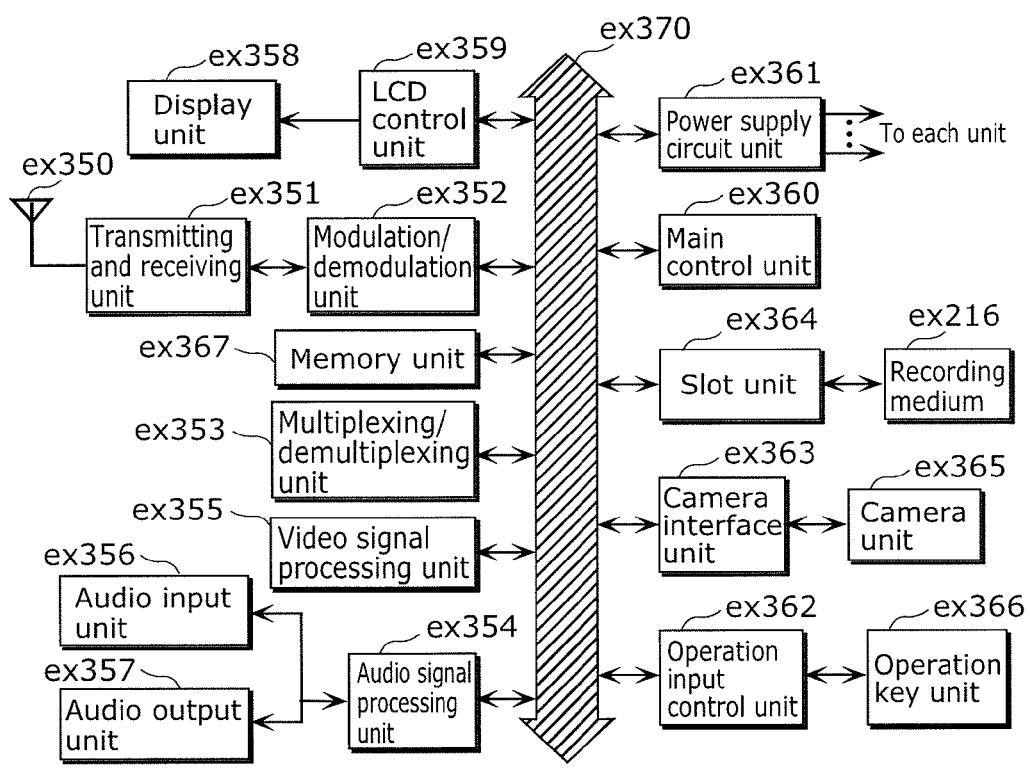
FIG. 23B is a block diagram showing an example of a configuration of a cellular phone.

Next, an example of a configuration of the cellular phone ex114 will be described with reference to FIG. 23B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 to have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since the standard to which each of the plurality of video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 24 illustrates a structure of the multiplexed data. As illustrated in FIG. 24, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 25:
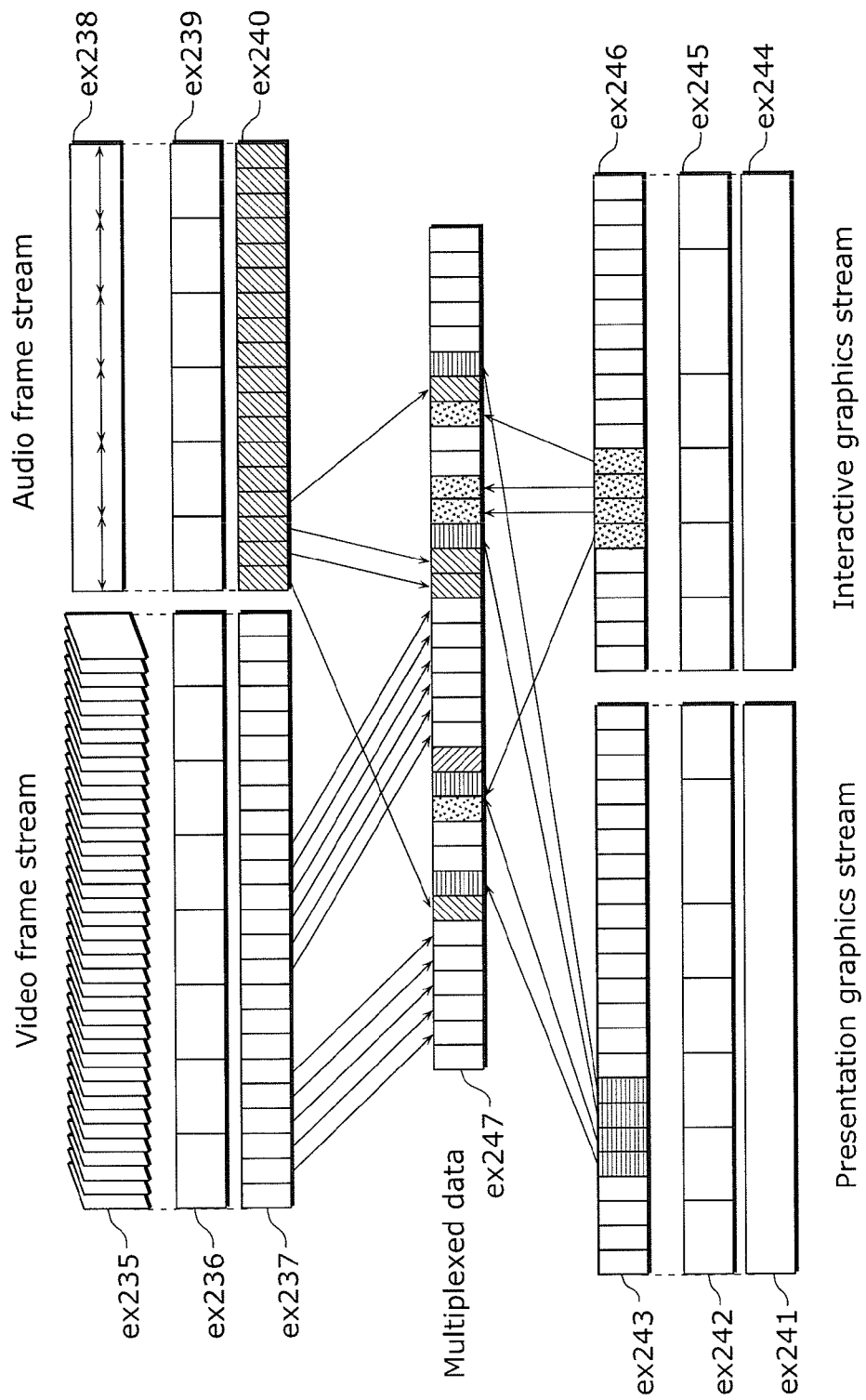
FIG. 25 is a diagram schematically illustrating how each stream is multiplexed in multiplexed data.

FIG. 25 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 26:
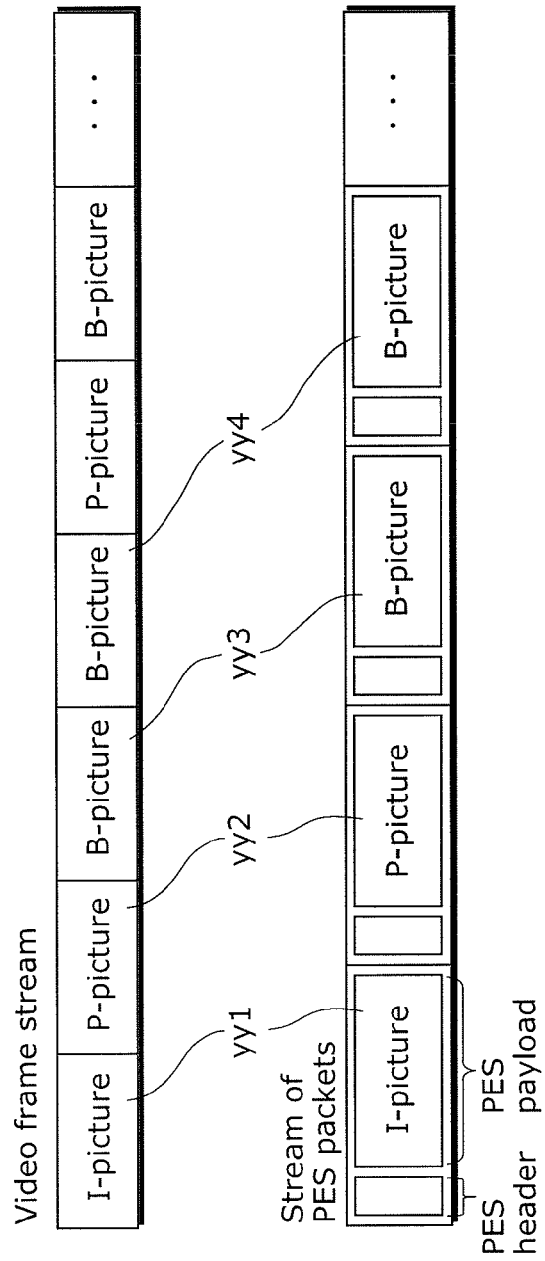
FIG. 26 is a diagram illustrating in more detail how a video stream is stored in a stream of PES packets.

FIG. 26 illustrates how a video stream is stored in a stream of PES packets in more detail. The first bar in FIG. 26 shows a video frame stream in a video stream. The second bar shows the stream of PES packets. As indicated by arrows denoted as yy1, yy2, yy3, and yy4 in FIG. 26, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 27:
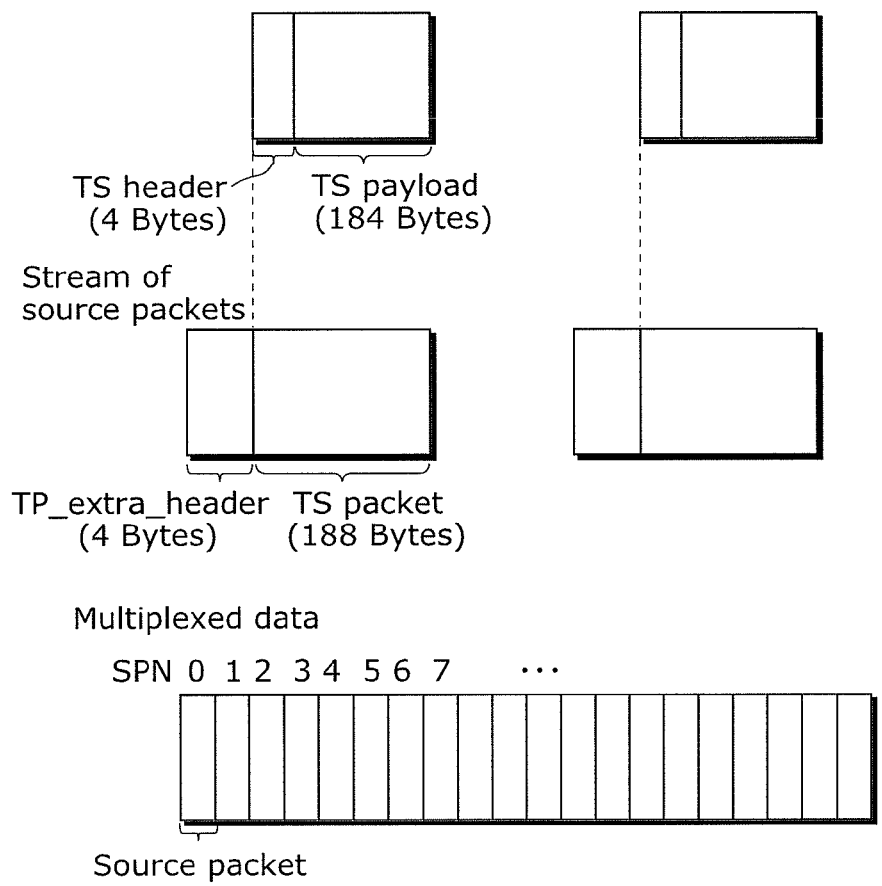
FIG. 27 is a diagram illustrating a structure of TS packets and source packets in the multiplexed data.

FIG. 27 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 27. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 28:
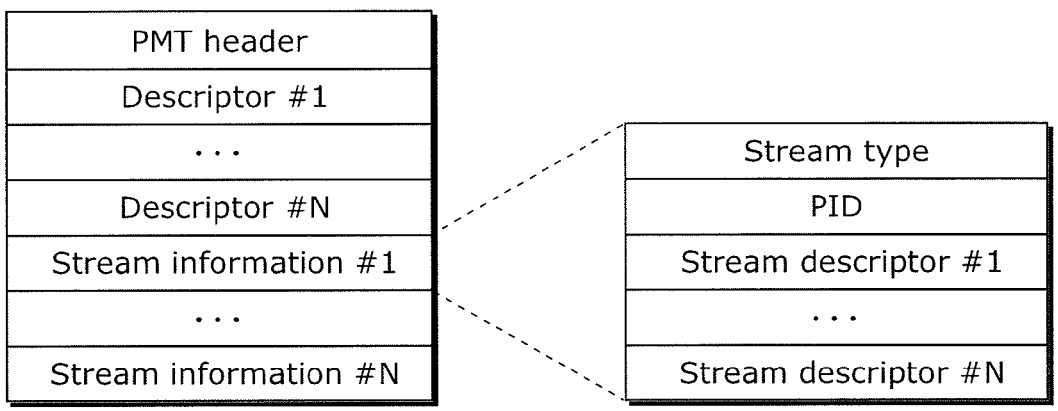
FIG. 28 is a diagram illustrating a data structure of a PMT.

FIG. 28 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 29:
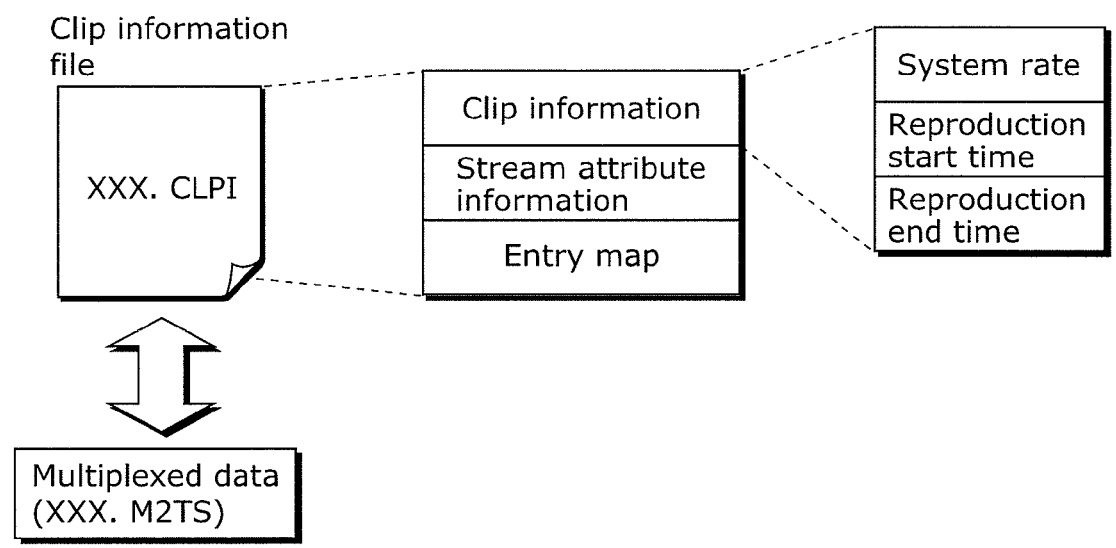
FIG. 29 is a diagram illustrating an internal structure of multiplexed data information.

Each of the multiplexed data information files is management information of the multiplexed data as shown in FIG. 29. The multiplexed data information files are in one to one correspondence with the multiplexed data, and each of the files includes multiplexed data information, stream attribute information, and an entry map.

As illustrated in FIG. 29, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 30:
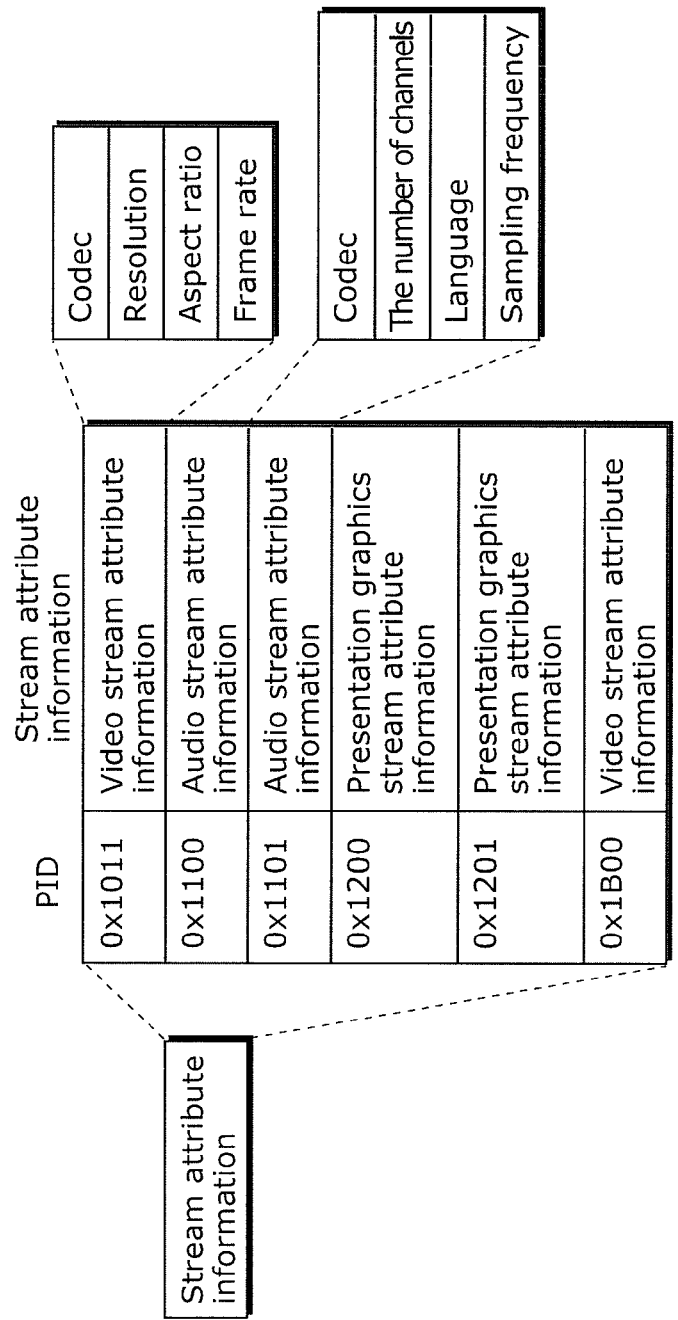
FIG. 30 is a diagram illustrating an internal structure of stream attribute information.

As shown in FIG. 30, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 31:
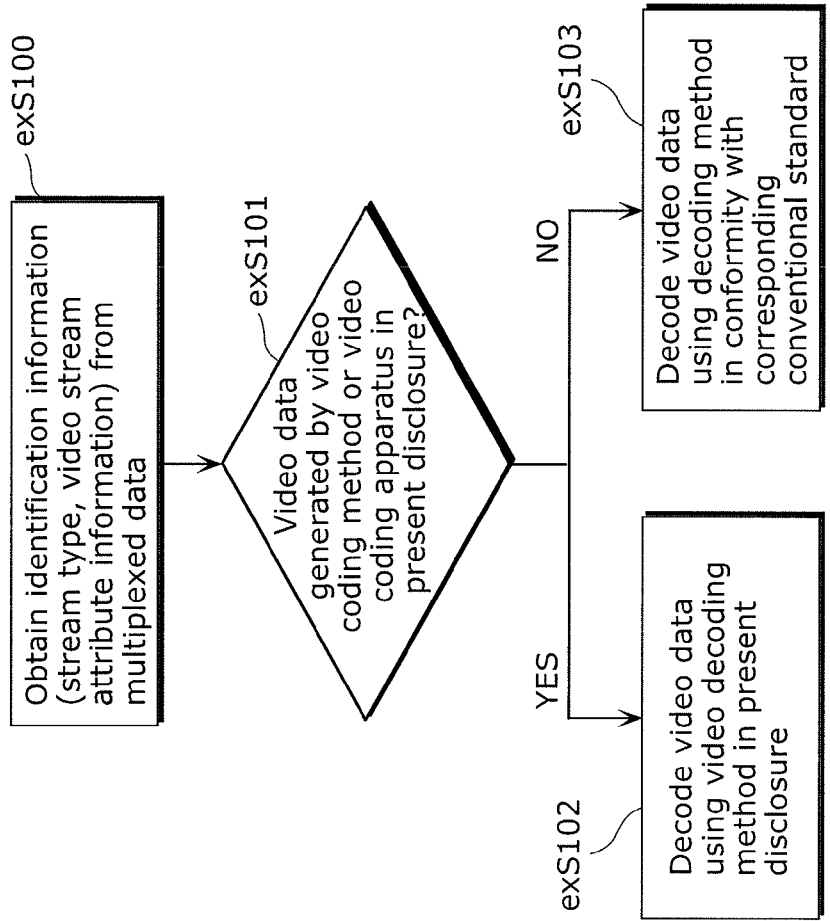
FIG. 31 is a diagram illustrating steps for identifying video data.

Furthermore, FIG. 31 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Figure 32:
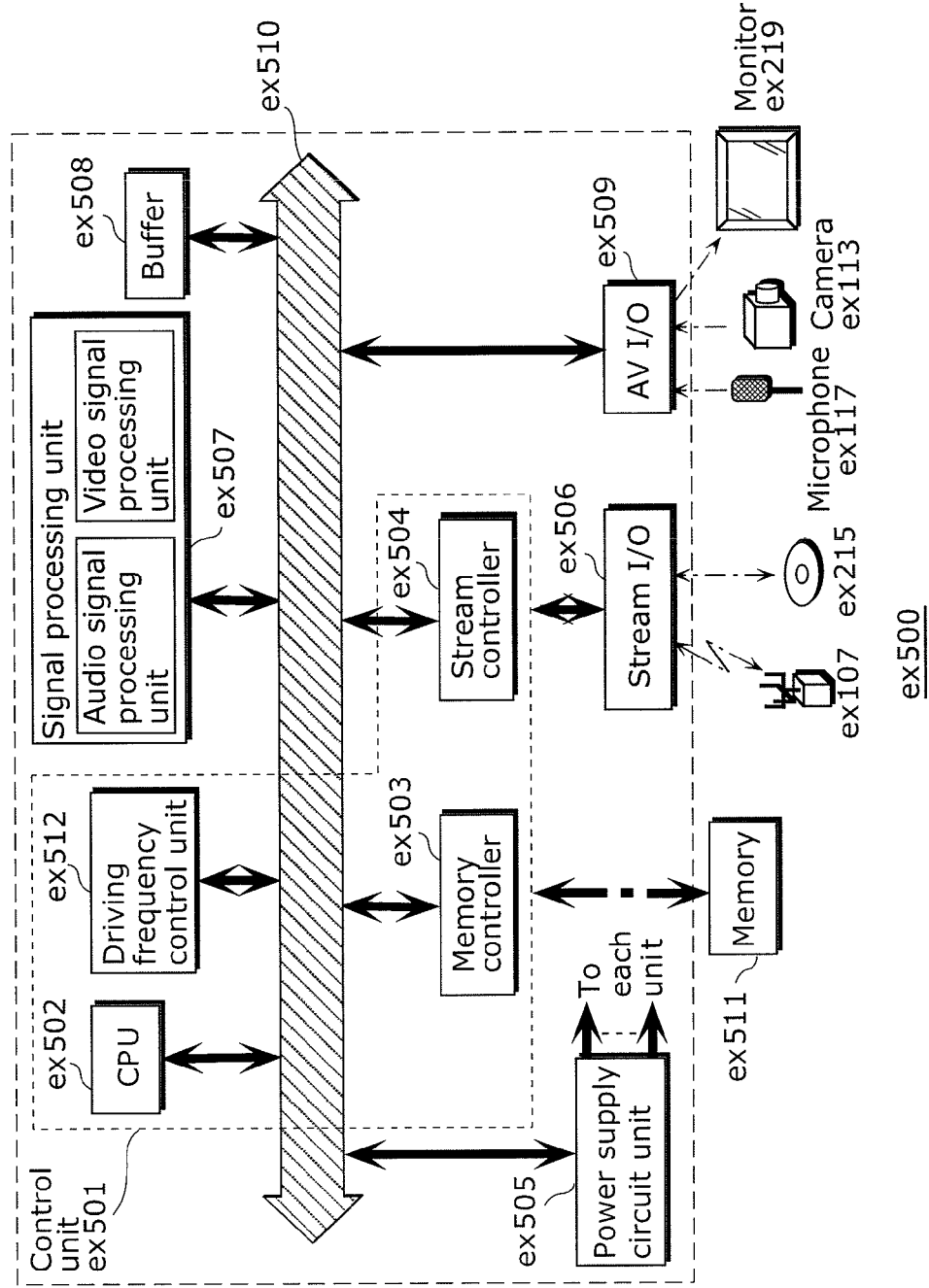
FIG. 32 is a block diagram illustrating an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 32 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV JO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed.

Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 8

When video data generated in the moving picture coding method or by the moving picture coding apparatus described in each of embodiments is decoded, it is possible for the processing amount to increase compared to when video data that conforms to a conventional standard, such as MPEG-2, MPEG-4 AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 33:
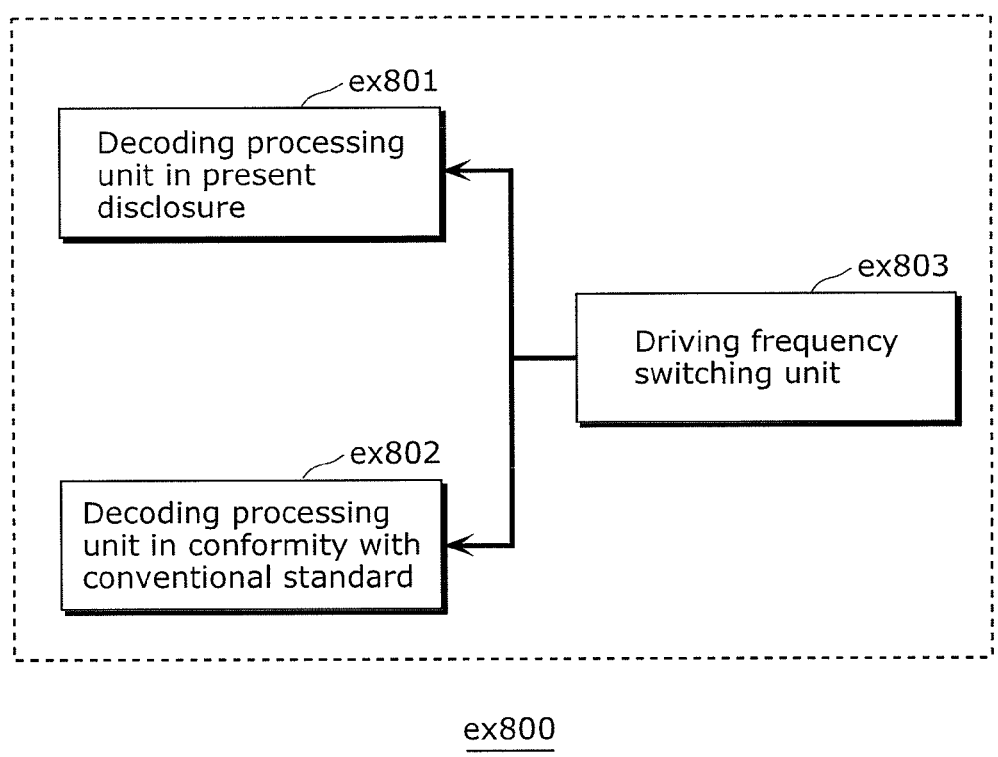
FIG. 33 is a diagram illustrating a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 33 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 32. Here, each of the decoding processing unit ex801 that executes the moving picture decoding method described in each of embodiments and the decoding processing unit ex802 that conforms to the conventional standard corresponds to the signal processing unit ex507 in FIG. 32. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, it is possible that the identification information described in Embodiment 6 is used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 35. The driving frequency can be selected by storing the look-up table in the buffer ex508 and in an internal memory of an LSI, and with reference to the look-up table by the CPU ex502.

Figure 34:
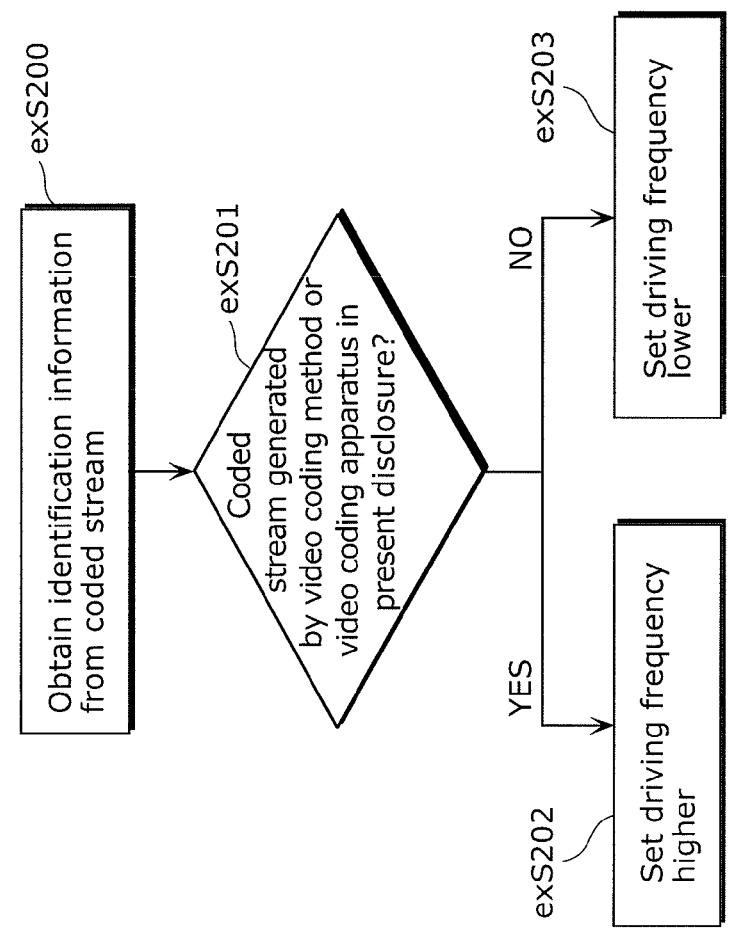
FIG. 34 is a diagram illustrating steps for identifying video data and switching between driving frequencies.

FIG. 34 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, it is possible that the voltage to be applied to the LSI ex500 or the apparatus including the LSI ex500 is set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, it is possible that the driving frequency is set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, it is possible that the voltage to be applied to the LSI ex500 or the apparatus including the LSI ex500 is set higher. When the identification information indicates that the video data conforms to the conventional standard, such as MPEG-2, MPEG-4 AVC, and VC-1, it is possible that the voltage to be applied to the LSI ex500 or the apparatus including the LSI ex500 is set lower. As another example, it is possible that, when the identification information indicates that the video data is generated by the moving picture coding method and the moving picture coding apparatus described in each of embodiments, the driving of the CPU ex502 is not suspended, and when the identification information indicates that the video data conforms to the conventional standard, such as MPEG-2, MPEG-4 AVC, and VC-1, the driving of the CPU ex502 is suspended at a given time because the CPU ex502 has extra processing capacity. It is possible that, even when the identification information indicates that the video data is generated by the moving picture coding method and the moving picture coding apparatus described in each of embodiments, in the case where the CPU ex502 has extra processing capacity, the driving of the CPU ex502 is suspended at a given time. In such a case, it is possible that the suspending time is set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 36A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. It is possible for a decoding processing unit ex902 that conforms to MPEG-4 AVC to be shared by common processing operations, and for a dedicated decoding processing unit ex901 to be used for processing which is unique to an aspect of the present invention and does not conform to MPEG-4 AVC. In particular, since the aspect of the present invention is characterized by entropy decoding, it is possible, for example, for the dedicated decoding processing unit ex901 to be used for entropy decoding, and for the decoding processing unit to be shared by any or all of the other processing, such as inverse quantization, deblocking filtering, and motion compensation. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 36B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Although image coding methods and image decoding methods according to the plural aspects are described based on the Embodiments, the present disclosure is not limited to such Embodiments. Various modifications to the present embodiments that can be conceived by those skilled in the art, and forms configured by combining constituent elements in different embodiments without departing from the teachings of the present disclosure are included in the scope of one or more of the aspects.

Although the exemplary embodiments have been described, the claims of the present application are not limited to the previously described embodiments. Those skilled in the art will readily appreciate that various modifications may be carried out on the respective embodiments, and other embodiments may be obtained by arbitrarily combining the structural elements of the respective embodiments, without departing from the novel teachings and advantages of the subject matter described in the appended claims. Therefore, such modifications and other embodiments are included in the present disclosure.

INDUSTRIAL APPLICABILITY

The present disclosure can be applied to an image coding method, an image decoding method, an image coding apparatus, and an image decoding apparatus. Furthermore, the present disclosure can be used in high-definition information display devices or image-capturing devices which include an image coding apparatus, such as a television, a digital video recorder, a car navigation system, a cellular phone, a digital camera, a digital video camera, and so on.

What is claimed is:

1. A non-transitory recording medium including a program, the program causing a processor to execute operations, the operations comprising:
   obtaining pieces of coded data included in a bitstream, the pieces of coded data being generated by coding tiles, the tiles being obtained by dividing a picture; and
   decoding the pieces of coded data to generate image data of the tiles,
   wherein in the obtaining of the pieces of coded data, tile boundary independence information is further obtained from the bitstream, the tile boundary independence information indicating whether each of boundaries between the tiles is one of a first boundary or a second boundary, and
   the decoding of the pieces of coded data includes:
      generating image data of a first tile, which is one of the tiles, by decoding a first code string included in first coded data with reference to decoding information of a decoded tile, which is another one of the tiles, when the tile boundary independence information indicates the first boundary, and by decoding the first code string without referring to the decoding information of the decoded tile when the tile boundary independence information indicates the second boundary, the first coded data being one of the pieces of coded data; and
      adding a bit string after the first code string to make a bit length of first coded data, which is one of the pieces of coded data, a multiple of a predetermined N bits, with N being an integer greater than or equal to 2.

2. A non-transitory computer-readable medium storing a bitstream, the bitstream comprising:
   a picture which is divided into titles; and
   tile boundary independence information indicating whether each boundary between the tiles is one of a first boundary or a second boundary,
   wherein a first tile of the tiles is coded with reference to coding information of a coded tile neighboring the first tile when a boundary between the first tile and the coded tile is the first boundary,
   the first tile is coded without reference to the coding information of the coded tile when the boundary between the first tile and the coded tile is the second boundary, and
   a bit string is added after a first code string, which is decoded to generate image data of the first tile, to make a bit length of first coded data, which is one of pieces of coded data, a multiple of a predetermined N bits, with N being an integer greater than or equal to 2.

3. A non-transitory recording medium including a program, the program causing a processor to execute operations, the operations comprising:
   obtaining pieces of coded data included in a bitstream, the pieces of coded data being generated by coding tiles, the tiles being obtained by dividing a picture; and
   decoding the pieces of coded data to generate image data of the tiles,
   wherein in the obtaining of the pieces of coded data, tile boundary independence information is further obtained from the bitstream, the tile boundary independence information indicating whether each of boundaries between the tiles is one of a first boundary or a second boundary, and
   the decoding of the pieces of coded data includes:
      generating image data of a first tile, which is one of the tiles, by decoding a first code string included in first coded data with reference to decoding information of a decoded tile, which is another one of the tiles, when the tile boundary independence information indicates the first boundary, and by decoding the first code string without referring to the decoding information of the decoded tile when the tile boundary independence information indicates the second boundary, the first coded data being one of the pieces of coded data.

* * * * *